US011086685B1

(12) United States Patent
Koppes et al.

(10) Patent No.: US 11,086,685 B1
(45) Date of Patent: Aug. 10, 2021

(54) DEPLOYMENT OF VIRTUAL COMPUTING RESOURCES WITH REPEATABLE CONFIGURATION AS A RESOURCE SET

(71) Applicant: Amazon Technologies, Inc., Seattle, WA (US)

(72) Inventors: Samuel Koppes, Bothell, WA (US); Ryan John Lohan, Seattle, WA (US); Santosh Kalyankrishnan, Seattle, WA (US); Luis Eduardo Colon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 16/017,921

(22) Filed: Jun. 25, 2018

Related U.S. Application Data

(60) Provisional application No. 62/662,671, filed on Apr. 25, 2018.

(51) Int. Cl.
*G06F 9/50* (2006.01)
*G06F 9/455* (2018.01)
*G06F 9/451* (2018.01)

(52) U.S. Cl.
CPC ........ *G06F 9/5077* (2013.01); *G06F 9/45558* (2013.01); *G06F 9/451* (2018.02); *G06F 2009/45562* (2013.01); *G06F 2009/45583* (2013.01)

(58) Field of Classification Search
CPC .............. G06F 9/5077; G06F 9/45558; G06F 2009/45583; G06F 9/451; G06F 2009/45562
See application file for complete search history.

(56) References Cited

U.S. PATENT DOCUMENTS

| 9,256,452 | B1* | 2/2016 | Suryanarayanan ..... G06F 9/455 |
| 10,592,068 | B1 | 3/2020 | Sedky et al. |
| 2011/0320605 | A1 | 12/2011 | Kramer et al. |
| 2013/0332920 | A1 | 12/2013 | Laor |
| 2014/0365668 | A1 | 12/2014 | Jaisinghani et al. |
| 2016/0004551 | A1 | 1/2016 | Terayama et al. |
| 2016/0164723 | A1* | 6/2016 | Cimprich ............ H04L 41/0806 709/221 |
| 2017/0041189 | A1 | 2/2017 | Aswathanarayana et al. |
| 2017/0339013 | A1 | 11/2017 | Allen |

* cited by examiner

*Primary Examiner* — Sisley N Kim
(74) *Attorney, Agent, or Firm* — Nicholson De Vos Webster & Elliott LLP

(57) ABSTRACT

A resource management system of a computing resource service provider supports the provisioning of multiple identical or substantially similar virtual computing resource instances using a single resource definition by creating a resource set entity to which the provisioned instances belong. The resource management system controls the provisioning based on a template containing the resource definition and designed to service a situation where the intent is to create a group of similar or closely-related resources. The group of instances (i.e., items in the resource set) can be dimensioned by specifying the size of the set, or by mapping the set to another set of keys associated with a different context. A resource set definition in the template can include a program expression that the system evaluates to produce a list of the keys, and the instances may be created based on the number of keys and their associated values.

21 Claims, 11 Drawing Sheets

DEPLOYMENT OF VIRTUAL COMPUTING RESOURCES WITH REPEATABLE CONFIGURATION AS A RESOURCE SET

CROSS-REFERENCE TO RELATED APPLICATIONS

This application is a non-provisional of, and claims the benefit of priority from, U.S. Prov. Pat. App. Ser. No. 62/662,671, filed under the same title on Apr. 25, 2018, and incorporated in its entirety herein by reference.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual computing resources, such as virtual machines that appear and operate as independent computing devices to users of a data center. The single physical computing device can create, maintain, delete, or otherwise manage virtual resources in a dynamic manner. In some scenarios, various virtual machines may be associated with different combinations of operating systems or operating system configurations, virtualized hardware and networking resources, and software applications, to enable a physical computing device to provide different desired functionalities, or to provide similar functionalities more efficiently.

In turn, users can request computer resources from a data center, including single computing devices or a configuration of networked computing devices, and be provided with varying numbers of virtual machine resources. Virtualization also scales upward from virtual machines; entire data centers and even multiple data centers may implement computing environments with varying capacities, such as a virtual private network and a virtual private "cloud" computing environment. A network of hardware computing devices can cooperatively use virtualization technologies to provide virtual computing resources and computing services to users of a computing resource service provider. Access to resources and data can be tightly controlled by a user account owner, an administrator, a group, a service, or the computing resource service provider itself; access can be based on many different parameters, such as user credentials, resource attributes, network configurations, and the like.

The provision of virtual computing resources as discrete instances configured for use as if they were typical data center hardware components, such as servers, disk storage, and network adapter cards, is known as infrastructure as a service (IaaS). An IaaS provider can also provide backend computing architecture implementing computing resources and services for, among other things, billing and account management, networking support such as monitoring and load balancing, security, backup and redundancy, and resource configurations and interoperability frameworks. A user can invoke these resources and services to create workflows, automate tasks, monitor and update deployed infrastructure, and otherwise manage its computing resources. An IaaS framework can enable a user to manage its infrastructure programmatically, a concept known as infrastructure as code (IaC). The "code" in IaC is machine-readable instructions organized as discrete definitions for each infrastructure component; the provider's virtual resource management service executes the instructions to rapidly provision, configure, and deploy instances of a virtual computing resource. IaC automates infrastructure deployment and combats configuration drift by conforming virtual resource instances to the corresponding definition.

BRIEF DESCRIPTION OF THE DRAWINGS

Various techniques will be described with reference to the drawings, in which.

DETAILED DESCRIPTION

Figure 1:
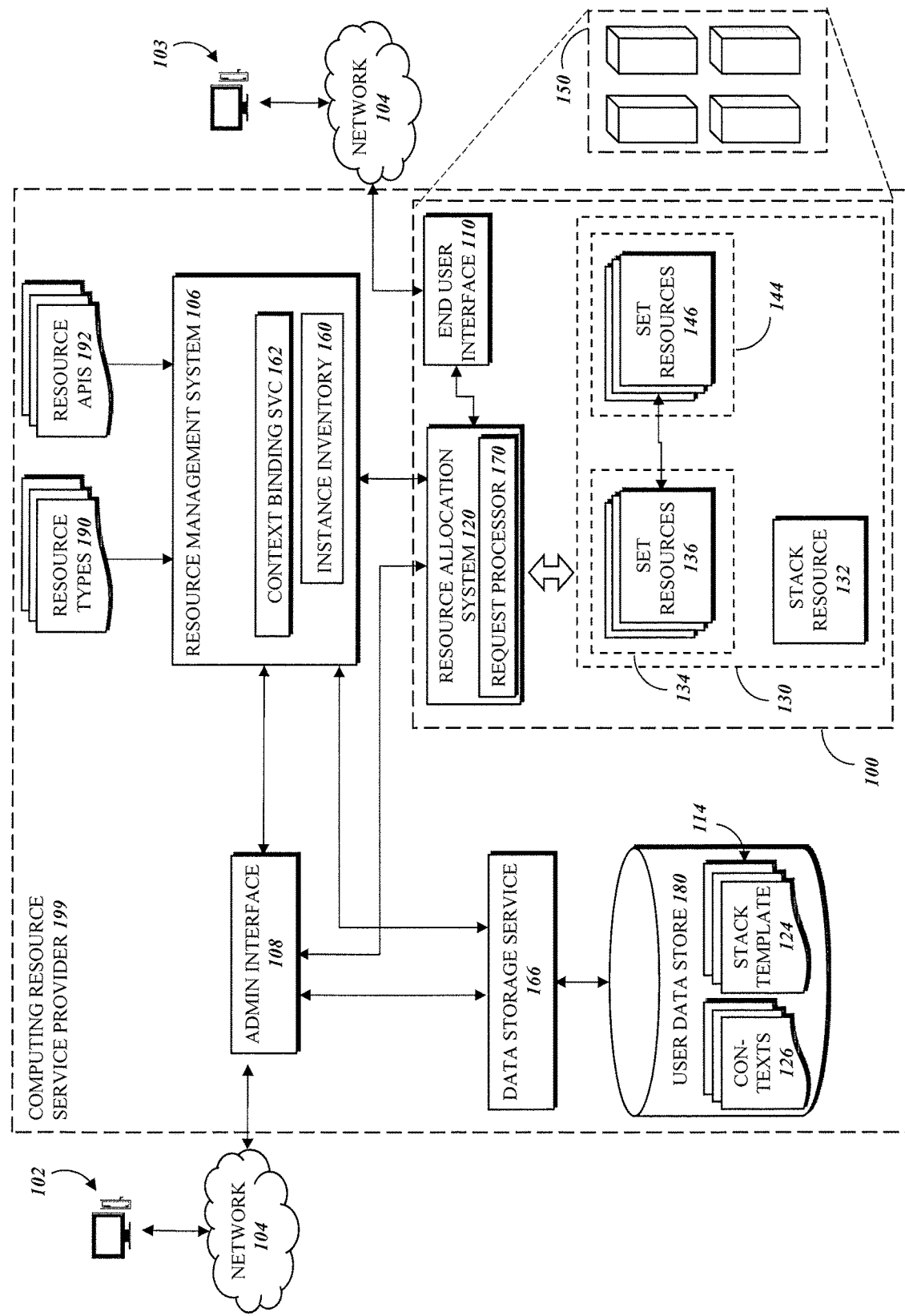
FIG. 1 is a diagram of a computing environment of a computing resource service provider, in which various embodiments of the present systems and methods can be implemented in accordance with this disclosure.

In the context of a computing resource service provider, a client makes requests to have computing resources of the computing resource service provider allocated for the client's use. One or more services of the computing resource service provider receive the requests and allocate physical computing resources, such as usage of a computer processor, memory, storage drives, computer network interfaces, and other components of a hardware computing device, to the client. In some computing systems, a virtualization layer of the computing system generates instances of "virtual" computing resources that represent the allocated portion of corresponding physical computing resources. In this infrastructure as a service (IaaS) environment, the client may operate and control, as its own computing infrastructure, instances of virtual computing resources, including without limitation: virtual machine instances each emulating a complete computing device having an operating system, processing capabilities, storage capacity, and network connections; virtual machine instances or other containers for performing specific processes; virtual network interfaces each enabling one or more virtual machine instances to use an underlying network interface controller in isolation from each other; virtual data stores operating like hard drives or databases; and the like. The computing resource service provider may provision the virtual computing resources to the client in the client's own virtual computing environment(s), which can be communicatively isolated (or restricted, e.g., via security policies) from the environments of other clients. The computing resource service provider may allow the client to configure its virtual computing resources, so they can receive connections from the computing devices of end users; the client's virtual computing resources can provide software applications, web services, and other computing services to the end users.

One or more services of the computing resource service provider may, as described further below, be responsible for allocating a virtual computing resource, configuring the virtual computing resource, and deploying the virtual computing resource into the client's virtual computing environment. An IaaS environment that implements infrastructure as code (IaC) concepts enables this resource management service to obtain a resource definition comprising program code, and interpret and execute the resource definition to identify the resource type, allocate the appropriate virtualized physical resources for a virtual resource instance of the corresponding type, apply a defined configuration to the virtual resource instance, and deploy the virtual resource instance into the virtual computing environment. Virtual computing resources are deployed into a client's virtual computing environment by creating the instance within corresponding resources allocated to the environment and connecting the instance to other virtual computing resources and sometimes also to computing networks that interface with end user devices. In one implementation, the virtualization layer (e.g., containing one or more hypervisors) of the computing system generates one or more virtual networks within the environment, and a new instance receives an address (e.g., an IPv4 address) on the virtual network and can then communicate with other components on the virtual network. The virtual network may be attended by physical or virtual networking components such as network interfaces, firewalls, load balancers, and the like, which implement communication protocols, address spaces, and connections between components and to external communication networks (e.g., the internet and other wide-area networks). In various implementations, a client can configure various aspects of the virtual network and its attendant components.

A client may create a configuration template that includes one or more IaC resource definitions. A template can be used to normalize resource definitions, such as by formatting the definitions to be read by the resource management service; format specifications may include programming language, schema, libraries, application programming interfaces (APIs), and other data sources to use to enable the resource management service to execute the resource definition's program code. A template may define a particular class of virtual computing resources. For example, a "web server" configuration template may include parameters that have default and/or customizable values; a virtual machine instance adopts these parameters to operate as a web server within the client's virtual computing environment. The client may configure requests that specify the class of virtual machine instance as "web server," and the resource allocation system that processes the request may interpret the web server configuration template to "spin up" new virtual machine instances as web servers that have the same parameters.

Additionally or alternatively, a template can be used to define a logical container, referred to interchangeably herein as a "stack," containing the resource definitions of multiple virtual computing resources that the client wants to subject to some common management operations. In various embodiments, a logical container can include definitions for multiple different types of resources, and/or for multiple configurations of the same type of resource, and/or for multiple instances of the same configuration of a resource; resources in the same stack may be configured to interface with each other, but this is not required. In various examples, the resources in a stack cooperate to provide the infrastructure for an end-to-end computing solution, such as a server or database application. In one particular example, the stack definition may include resource definitions for: a virtual machine to be configured as a web server having a popular blogging software application installed thereon; an SQL database to be mounted to the web server as local storage; and, a security group to be applied to the web server to allow public device connections over port 80 and secure connections over port 22, and to deny all other connections. The template may be used to automate deployment of identical stacks of the resources, making the application scalable and the user experience consistent.

Instantiating resources within a logical container allows the user, and other provider services, to manage the corresponding resource instances as a single unit. In various embodiments, the virtual resource instances may be created, updated, and/or deleted by creating, updating, or deleting a stack instance. In some embodiments, all virtual resource instances must be created or deleted successfully for the stack to be created or deleted; if, for example, a virtual resource instance fails to be created, the system may "roll back" the stack by automatically deleting any stack resources that have already been created, and undoing any other actions associated with creating the stack. Other instance lifecycle management operations may be efficiently performed using stacks, some of which are described further below.

In some computing environments, IaC design may be used to launch multiple, perhaps hundreds of, virtual resource instances that are identical, substantially similar, closely related, or otherwise configured in a manner that would benefit from a highly repeatable resource definition in the template. Otherwise, the template would have to include an explicit definition of each virtual resource, even if the corresponding configurations are identical. The present disclosure provides systems and methods for creating sets of such closely related virtual computing resources in a virtual computing environment (VCE), in order to launch a predetermined number of instances from a single resource definition, and to manage the set of resources as a unit. The resource set can be a logical container, and can be launched within another logical container, so that the set can be managed together with other virtual computing resources in the logical container containing the resource set. For clarity of description, the logical containers in the present systems will be referred to as "stacks" and/or "resource sets" to distinguish between a logical container for the commonly configured virtual resource instances (i.e., the resource set) and the logical container for the resource set and possibly other resources (i.e., the stack). The term stack is not intended to suggest any structural relationship between the resources within the stack, nor does the term necessitate any relationship between the resources beyond their being grouped together logically (as in the examples described below) in order to control the resources as a unit. In contrast, the resources belonging to a resource set may be, but are not necessarily, related beyond their simple logical grouping, as described below.

In some cases, instances of a virtual computing resource belonging to a logical container are launched by launching the logical container. Resources belonging to a stack are referred to herein as "members" of the stack, and resources or groups of corresponding resources belonging to a resource set are referred to as "items." When a resource set is a member of a stack, the items in the resource set are also members of the stack. A stack may have an associated configuration template, and the resource set may have a resource set definition within the stack template, as described further below. The resource management system uses the stack template to set the initial configuration of a new instance for each of the stack's virtual computing resources, and to prepare the new instances for deployment. This includes the resource set, which in some embodiments may be provisioned and deployed as a logical, operational, or computing resource in the VCE. An item of a resource set may include one or more virtual resource instances configured using an item definition expressed in the resource set definition; when deployed, the instances created using the item definition are associated with the resource set. An executing stack may therefore include one or more virtual resource instances executing in an execution environment of the VCE of a user. Changes to an existing stack may be made by changing the stack template and then executing an update command, causing the resource management system to determine the changes that have been made, and to update or re-create (by executing the modified template) only those virtual resource instances that are affected by the changes.

The instances may each have a resource type associated with a virtual computing resource, an operational resource, a security group, a security policy, or any other resource having a type that is understood within the VCE and/or by a resource management system of a computing resource service provider that provides the VCE. The parameters of the resource type, together with the formatting requirements (e.g., programming language, schema) of the stack template, determine the form and substance of each resource definition contained in the stack template and corresponding to one of the stack's resources. Resource definitions include the resource set definition and, within the resource set definition, an item definition for each of one or more types of items in the resource set. In some embodiments, the item definition may use the same syntax as resource definitions for stack resources that are not part of the resource set. Furthermore, an item definition may include multiple resource definitions each describing a corresponding configuration for virtual resource instances launched using the resource definition; executing the item definition may create an instance of an item in the resource set, the item instance comprising one or more virtual resource instances for each of the resource definitions within the item definition.

A resource set definition can include a dimension parameter, which specifies the number (i.e., quantity) of each item that is to be launched into and contained by the resource set. In some embodiments, the dimension parameter is used to determine how many times the system should execute an item definition to launch the corresponding virtual resource instances; or, the dimension parameter may be used to determine how many virtual resource instances to launch from an item definition. The dimension parameter may have as its value a fixed integer, in some embodiments. Or, the value may be a list of data objects (e.g., from another source), and the number of data objects determines the number of each item. Or, the dimension parameter may be a reference to a list of data objects, or an executable function that returns a list of data objects; the system may use the dimension parameter to bind the resource set to another set of data objects, such as configuration parameters or another resource set. The item definition describes one or more configurations for virtual resource instances. The item definition may include a name for the corresponding items, and/or each resource definition in the item definition may include a name for the corresponding virtual resource instances; in some embodiments, the system at execution time may combine the name with a value of a variable data element to produce a unique logical identifier for each virtual resource instance. In some embodiments, the system may use a set of keys obtained from another context, such as that of a reference set of data objects, to generate the logical identifiers, such that each virtual resource instance in the resource set is associated, via the key value in its logical identifier, with the data object in the reference set that has the same key value.

Systems and methods are described for performing several variations of resource set deployment using IaC resource definitions and other template modifications described herein. The system can perform management operations on a resource set and its items using the same commands and semantics as are used to manage other resources of a stack as a unit. Additionally or alternatively, management operations can have sub-operations that the system performs to coordinate resources of the resource set. For example, the system can adopt other stack resources that do not initially belong to the resource set, into the resource set, and can adopt resources outside of the stack into the resource set. In another example, when a first resource set is bound to a second resource set, and the second resource set is updated, an update to the first resource set may be triggered in order to maintain consistency of the shared data elements.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Referring to FIG. 1, embodiments of the present disclosure may operate within or upon computing systems of a computing resource service provider 199 accessible by users of user computing devices 102, 103 via a computer network 104 such as the internet. In particular, a "client," or administrator of the virtual computing resources to be deployed, may access the computing systems of the computing resource service provider 199 (e.g., using the client's user account credentials) using a computing device 102 to connect to a first user interface 108; an end user may access the client's virtual computing resources using a computing device 103 to connect to a second user interface 110 or another endpoint that connects to the computer network 104. The user interfaces 108, 110 may be websites, web applications, command consoles, and the like, as described further below.

The computing resource service provider 199 implements at least one virtual computing environment 100 in which users may obtain virtual computing resources that enable the users to run programs, store, retrieve, and process data, access services of the computing resource service provider 199, and the like. The virtual computing environment 100 may be one of any suitable type and/or configuration of a compute resource virtualization platform implemented on one or more physical computing devices. Non-limiting examples of virtual computing environments 100 include data centers, clusters of data centers organized into zones or regions, a public or private cloud environment, and the like. The virtual computing environment 100 may be associated with and controlled and managed by the client (e.g., via the user interface 108). In some embodiments, the virtual computing environment 100 of a particular client may be dedicated to the client, and access thereto by any other user of the computing resource service provider 199 prohibited except in accordance with access permissions granted by the client, as described in detail herein.

The computing resource service provider 199 may include data processing architecture that implements systems and services that operate "outside" of any particular virtual computing environment and perform various functions, such as managing communications to the virtual computing environments, providing electronic data storage, and performing security assessments and other data analysis functions. These systems and services may communicate with each other, with devices and services outside of the computing resource service provider 199, and/or with the computing environments. It will be understood that services depicted in the Figures as inside a particular virtual computing environment 100 or outside all virtual computing environments may be suitably modified to operate in the data processing architecture in a different fashion that what is depicted.

In general, the user computing devices 102, 103 can be any computing device such as a desktop, laptop, mobile phone (or smartphone), tablet, kiosk, wireless device, and other electronic devices. In addition, the user computing devices 102, 103 may include web services running on the same or different data centers, where, for example, different web services may programmatically communicate with each other to perform one or more techniques described herein. Further, the user computing devices 102, 103 may include Internet of Things (IoT) devices such as Internet appliances and connected devices. Such systems, services, and resources may have their own interface for connecting to other components, some of which are described below. Although one or more embodiments may be described herein as using a user interface, it should be appreciated that such embodiments may, additionally or alternatively, use any CLIs, APIs, or other programmatic interfaces.

A network 104 that connects a user device 102 to the computing resource service provider 199 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. In some embodiments, the network 104, may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Accordingly, a user of a user device 102, 103 may access the computing resource service provider 199 via a user interface 108, 110, which may be any suitable user interface that is compatible with the user device 102, 103 and the network 104, such as an API, a web application, web service, or other interface accessible by the user device 102, 103 using a web browser or another software application, a command line interface, and the like. In some embodiments, the user interface 108, 110 may include code and/or instructions for generating a graphic console on the user device 102, 103 using, for example, markup languages and other common web technologies. The first, or administrative, interface 108 may, via the connecting device 102, present a user with various options for configuring, requesting, launching, and otherwise operating virtual computing resources in one or more of the computing environments 100. The second, or end user, interface 110 may, via the connecting device 103, present a user with static, dynamic, and/or interactive content processed and provided via virtual computing resources 132, 142 executing in the client's virtual computing environment 100. User input (e.g., text, computer files, selected elements from a list or menu, mouse clicks on buttons, and other interactions) entered into the user interface 108, 110 by the user may be received and processed by one or more components of the computing resource service provider 199, such as a resource management system 106, a data storage service 166, and/or one or more components in the computing environment 100, such as a resource allocation system 120.

For example, the client may use the user interface 108 to configure a virtual network, configure and launch (e.g., from a command line) virtual computing resources 142, create templates 114, 124 for instantiating logical containers 130, 134, 144 and virtual computing resources 132, 136, 146 in various contexts 126, and connecting them to the virtual network and/or the external communication network 104. Such processes may generate records describing the client's and/or end users' user accounts and store the user account records in a user data store 180. The records may include information indicating that an end user associated with the user account is authorized or approved to request and use virtual computing resources in the computing environment 100. The information may describe limitations on the end user's ability to use virtual computing resources. For example, user account information may specify the types of virtual computing resources the end user is allowed to request and/or the actions (e.g., read, write, copy) the end user is allowed to perform. In some embodiments, the templates 114 containing program code for launching programmable computing infrastructure (e.g., IaC) resources, including a stack template 124 that launches resource sets 134, 144 into the associated stack 130, may be stored in the user data store 180. In some embodiments, contexts 126, each comprising metadata and/or data elements associated with a distinct task or process, may be stored in the user data store 180. In various examples, a stack 130 may operate within one context 126, a resource set 134 within the stack 130 may operate within another context, and a reference set of data elements (e.g., a second resource set 144 in the stack 130, or a user account configuration data set (not shown)) may operate within yet another context 126. A data storage service 166 of the computing resource service provider may manage queries, data transfers, and other data processing for the records in the user data store 180.

A computing environment 100 may be configured to provide compute resources to users that are authorized to use all or part of the computing environment 100. Compute resources can include, for example, any hardware computing device resources, such as processor computing power/capacity, read-only and/or random access memory, data storage and retrieval systems, device interfaces such as network or peripheral device connections and ports, and the like. In some embodiments, these resources may be dispersed among multiple discrete hardware computing devices (e.g., servers 150); these hardware computing devices may implement or communicate with a virtualization layer and corresponding virtualization systems (e.g., a hypervisor on a server), whereby the compute resources are represented by, and made accessible as, virtual computing resources. A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

The computing environment 100 may be configured to allocate compute resources of corresponding hardware computing devices by virtualizing those resources to produce a fixed or variable quantity of available virtual computing resources. The available resources may be provided in a limited manner to one or more users that submit requests for virtual computing resources within the computing environment 100; virtual computing resources that are allocated to and/or in use by a particular user are represented by stack resources 132 and the corresponding set resources 136, 146 of two resource sets 134, 144. Various functions related to processing requests to use virtual resources, to otherwise managing the allocation and configuration of the available resources and allocated virtual resources, and to limiting the amount of virtual resources that are allocated to a particular user in accordance with the present systems, may be performed by one or more services executing within the computing environment 100 and/or outside of it (i.e., in the data processing architecture of the computing resource service provider 199).

In some embodiments, as illustrated in FIG. 1, a resource allocation system 120 operating within the computing environment 100 may cooperate with a resource management system 106 implemented outside of the computing environment 100 to manage the allocation of virtual resources and configuration and deployment of the virtual resources as virtual resource instances. In some embodiments, the resource allocation system 120 receives at least the communications that contain requests, commands, instructions, and the like (collectively herein, "requests"), to allocate, launch, execute, run, or otherwise provide, for use by an identifiable user (e.g., the requesting user or another specified user), one or more virtual computing resources in the computing environment 100. In various embodiments, these communications are sent to the resource allocation system 120 by any user or by the resource management system 106. A request received by the resource management system 106 may be generated directly by the client (e.g., using the user interface 108) or by the resource allocation system 120, or the request may be generated as, or in response to, an output (e.g., a trigger event message) of another component of the computing resource service provider 199 or of an external device.

The resource allocation system 120 may include one or more services, implemented in software or hardware devices, for performing pertinent tasks. In some embodiments, the resource allocation system 120 may include a request processor 170 which is configured by executable program instructions to receive a request for virtual computing resources, parse the request into delivery and other parameters, determine whether the request can be fulfilled based on the available resources, the requestor's credentials, and other parameters, and if the request can be fulfilled, provide a virtual computing resource configured for use according to the parameters of the request. The request processor 170 may additionally be configured to send the request, or some or all of the data contained in the request or describing the request, to the resource management system 106 for associated processing as described herein. The request processor 170 or another component of the resource allocation system 120 may be configured to send to the user interface 108 information related to processing the request, such as error, completion, and other status messages.

The resource allocation system 120 may additionally collect and/or generate usage data describing aspects of virtual computing resources executing in the virtual computing environment 100. Non-limiting examples of such usage data may include: configuration and/or status parameters of one or more of the set resources 136 at the time of launch or failure to launch; information related to the processing of a request to use virtual computing resources; monitoring data collected by monitoring resource operations, such as network communications, data storage and retrieval and other disk access operations, execution of software programs, and the like; and, state data such as a snapshot of the state of a virtual computing resource at the time it is provisioned, deploys, terminates, fails, or generates an error, or at any other time. The usage data may be sent to the resource management system 106, or the resource management system 106 may, by default or by user authorization, obtain the usage data from the resource allocation system 120 or from a data store.

The resource management system 106, among other operations, performs management operations on logical containers by applying the management operations to the members (e.g., resource sets 134, 144 and their corresponding resources 136, 146, and other stack resources 132) of an identified logical container (e.g., stack 130 in virtual computing environment 100). The resource management system 106 may, in some embodiments, be a global (i.e., in communication with all computing environments of the computing resource service provider 199) system, and may be implemented in the data processing architecture of the computing resource service provider 199. For example, the resource management system 106 may be part of a control plane that processes some of all of the network communications going into and coming out of the computing environments. In other embodiments, the resource management system 106 may include one or more components, such as services, that are distributed within and across the computing environments. One or more component services, implemented in software or hardware, may perform the various discrete tasks described herein, or in some embodiments may cause them to be performed by other services. Additionally or alternatively, the resource allocation system 120 may perform some or all of the resource management system 106 tasks, as described further herein.

The resource management system 106 may include an instance inventory 160 storing records for each of the virtual resource instances managed by the resource management system 106. One example of an instance inventory 160 is a database or other structured data store, which may be contained in, or referenced by, memory of the resource management system 106 (e.g., a memory module of the server(s) implementing the resource management system 106). The records may be database records, metadata records, files, rows in a table, etc. The information in a record may include parameters of the associated virtual resource instance, such as an instance identifier (i.e., the physical identifier within the virtual computing environment 100) for the instance, a stack identifier of the stack the instance belongs to, a template identifier of the template used to launch or reference the instance, etc. For example, a resource set record for a first resource set 134 may include information indicating that the virtual resource instances 136 belong to (i.e., are items or parts of items of) the resource set; the system may use the resource set record to associate a logical identifier defined in the stack template 124 with a physical identifier that the resource allocation system 120 uses to identify a particular set resource 136. In one embodiment, the instance inventory 160 may be a "master" inventory that tracks the virtual resource instances executing in all of the virtual computing environments of the computing resource service provider 199, while in other embodiments the instance inventory 160 may only track instances in the VCEs of a particular user or group of users, or only of a single VCE 100.

A template 114, 124 may be a structured document written in an object-oriented programming language such as JavaScript Object Notation (JSON) or YAML. The stack template 124 may define the stack 130 using program code that can be interpreted by the resource management system 106 and/or the resource allocation system 120 to create and configure the stack 130. Similarly, the stack template 124 may include one or more resource definitions that define the stack resources 132 that are always instantiated, from program code, as members of the stack 130 when a new stack 130 is created; the resource definitions for stack resources 132 may further be used to perform updates of the corresponding instances as described further below. Some stack resources 132 may be generated outside of any resources sets, which are defined by their own resource set definitions in the stack template 124. Set resources 136 may be defined by item definitions within the corresponding resource set definition. In some embodiments, the item definition may include a logical identifier used to identify the set resources 136 within the template 124, the stack 130, and the resource set 134. The item definition may further include information describing a configuration that is common to the set resources 136 that are launched from the item definition. The item definition may be formatted in the format of the rest of the template, as described further below. In some embodiments, the item definition may comprise one or more set resource definitions each describing a corresponding configuration for virtual resource instances that are launched using the item definition, and each set resource definition may include a logical identifier used to identify the set resources 136 of the set resource definition.

If the stack 130 hasn't been created, or if the stack 130 exists and was created from a master template or an earlier version of the stack template 124, the stack template 124 may never have been executed or even tested. Generally, changes can be made to a template 114 that is the "source of truth of resources" such as a logical container and its members, and then the resource management system 106 may receive requests to test the changes and, if the changes are accepted, to update or recreate the resources that were changed. Thus, if the stack 130 creation or update operation succeeds, the resource management system 106 will associate, or update an association of, the resource sets 134, 144 with the stack 130, the set resources 136, 146 with their corresponding resource set 134, 144, and the set resources 136 of one resource set 134 with the set resources 146 of another resource set 144 to which the first resource set 134 is bound. The resource management system 106 may save the stack template 124 as the new source of truth for the stack 130. The resource management system 106 may include a context binding service 162 that performs tasks associated with accessing a context 126 that is outside a resource set's context 126 in order to obtain data from the context and use the data to launch or manage the resource set and its items. For example, a first resource set 134 may be bound to a second resource set 144, and the resource sets 134, 144 may be in disparate contexts; the context binding service 162 may execute program code, such as a function provided in the resource set definition of the first resource set 134, to obtain values from the second resource set 144 for a set of keys, and then use the values to generate logical identifiers for the set resources 136 in the first resource set 134.

In some embodiments, the resource management system 106 may use values for the management operation parameters that are supplied by the client or an administrator of the corresponding user account. For example, an API such as the administrator user interface 108 may present prompts (e.g., graphically on the user device 102) for the administrator to enter values for any suitable parameter; the administrator may enter the values, and the resource management system 106 may receive the values and use them immediately or store them, such as in a template 114 or another record in the user data store 180. In addition or alternatively to configuring, deploying, and managing a virtual network and compute resources of the virtual computing environment 100, the client may use the administrator user interface 108 to initiate various resource management procedures described herein. For example, a template creation API may enable the client to submit or program one or more templates 114 comprising virtual computing resource definitions and other parameters that the resource allocation system 120, and/or other systems of the computing resource service provider 199, use to allocate, configure, and deploy virtual computing resource instances into the virtual computing environment 100. In some embodiments, a template creation API may enable the client to generate a template 114 that the system uses to launch resource sets comprising multiple virtual resource instances that are generated from a single resource definition. An example template is discussed below with respect to FIG. 3.

Figure 2A:
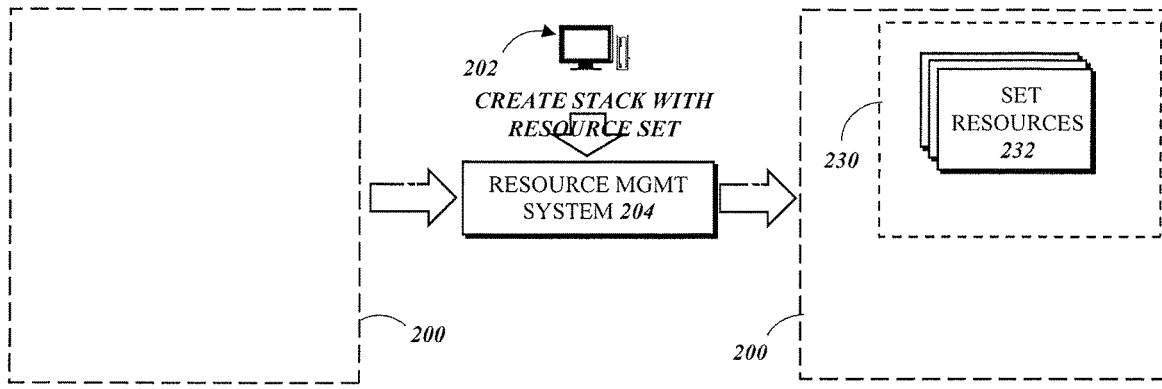
FIGS. 2A-F are diagrams of various resource set management functions that can be performed by a resource management system, in accordance with the present disclosure.
Figure 2B:
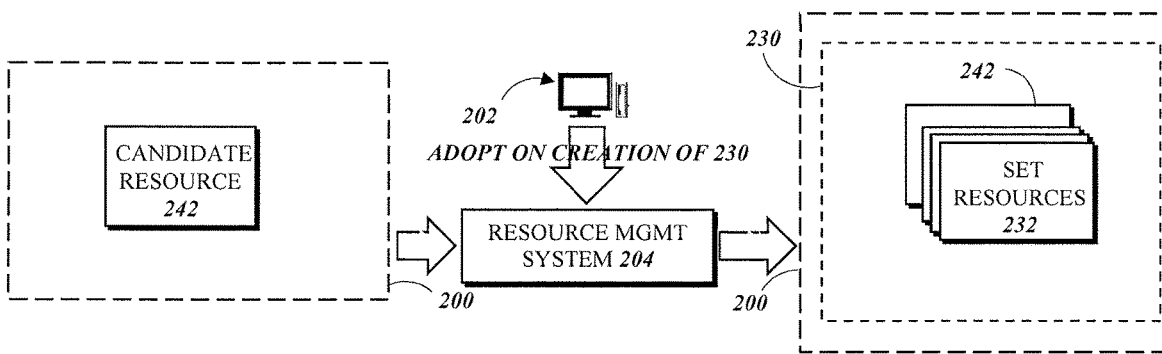

FIGS. 2A-F present example operations of a resource management system 204 (which may be identical or similar to the resource management system 106 of FIG. 1, or may be entirely different) that receives requests for stack management operations from a client (via client computing device 202) on virtual computing resources associated with the client's VCE 200. FIG. 2A illustrates an example action of creating a plurality of set resources 232 (i.e., from a single resource definition in a template) as members of a stack 230 when the stack 230 is first created in the VCE 200. FIG. 2B illustrates an example action of adopting an existing candidate resource 242 executing in the VCE 200 into a stack 230 when the stack 230 and its plurality of set resources 232 are being created in the VCE 200. The virtual resource definition for the candidate resource 242 may be added to the stack template to perform the adoption. After adoption, the management operations on the stack 230 are applied to the candidate resource 242 as well as the set resources 232 as a unit.

Figure 2C:
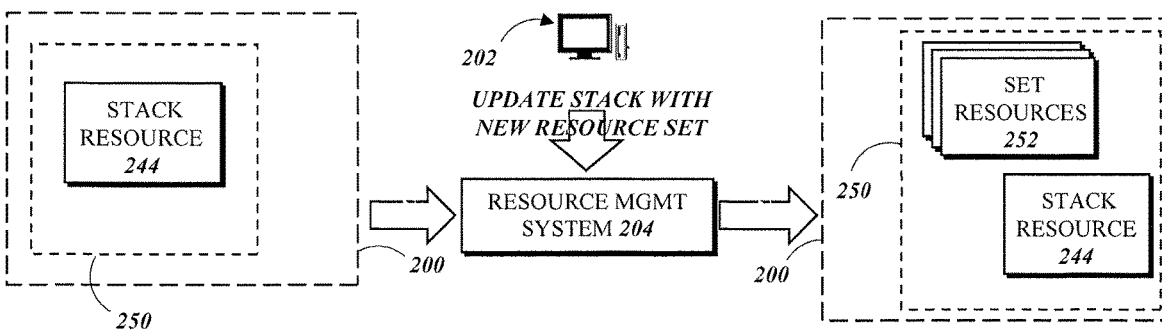

FIG. 2C illustrates an example update operation on an existing stack 250 in the VCE 200; the stack 250 contains stack resources 244 launched from a previous "master" stack template. The system, executing an updated stack template, identifies a new resource set definition in the template, and uses the item definition(s) in the resource set definition to launch a plurality (e.g., quantified using the dimension parameter of the resource set definition) of set resources 252 into the stack 250. For example, the updated stack template's resource set definition may include a first item definition describing a default configuration for a virtual machine and a second item definition describing a web server configuration for a virtual machine and a user data store configuration for a database; where the dimension parameter is N, the system may cause the resource allocation system in a target VCE to launch, as the set resource 252, N virtual machine instances having the default configuration, and Nitems each including a pair of instances—a virtual machine instance having the web server configuration and an associated database instance having the user data store configuration. After this update, the management operations on the stack 250 are applied to the stack resources 244 and the set resources 252 as a unit.

Figure 2D:
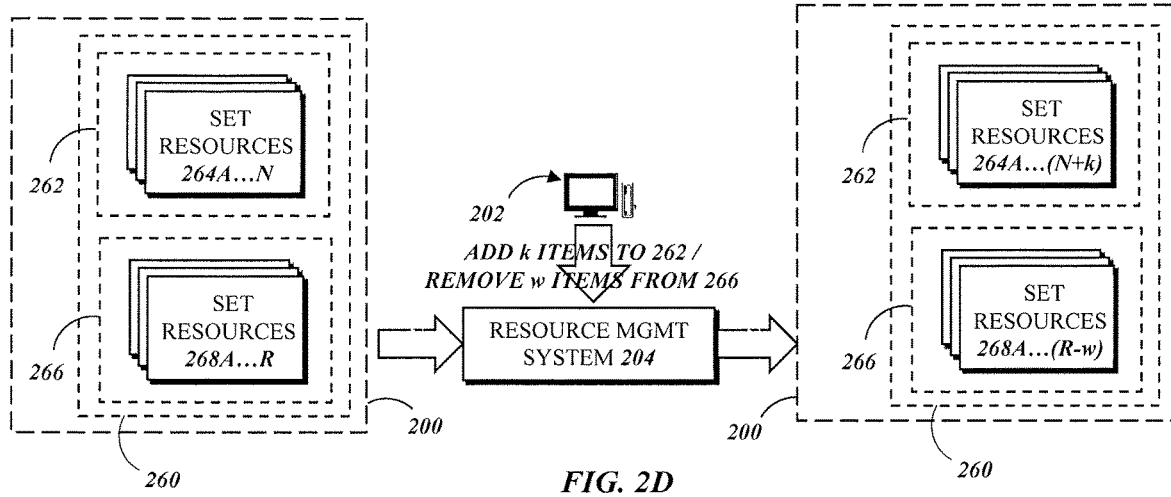

FIG. 2D illustrates an example action of updating a stack 260 that may include a first resource set 262 and a second resource set 266. The system determines that the update operation requires one or both of an increase in the size of a resource set 262 and a decrease in the size of a resource set 266. In the illustrated example, before the update the resource set 262 dimension is N (i.e., the resource set 262 contains N set resources 264A . . . N launched from a single resource definition) and the resource set 266 dimension is R (i.e., the resource set 266 contains R set resources 268A . . . R). To increase the resource set 262 dimension to N+k, the system may launch an additional k virtual resource instances from the same resource definition. To decrease the resource set 266 dimension to R−w, the system may select w set resources 268A-R and destroy them.

Figure 2E:
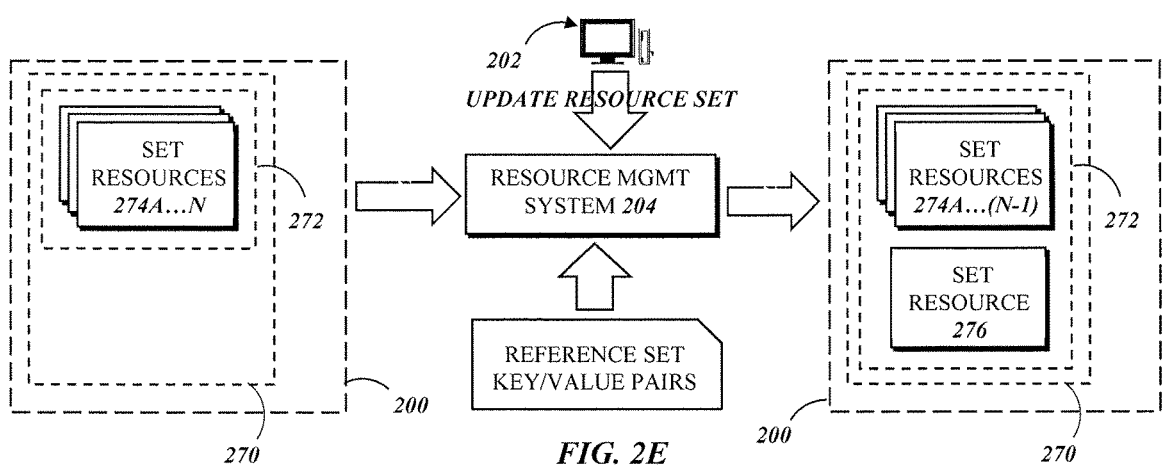

FIG. 2E illustrates an example action of updating a resource set 272 that contains a plurality of set resources 274A . . . N having a configuration that includes at least one variable parameter. The variable parameter may define an attribute of the instances in the resource set 272 that is configurable and can be different for each instance. Correspondingly, the resource set definition may assign to the variable parameter a logical value that the resource management system 204 resolves to a literal value when configuring and deploying each instance; the literal value may be unique to each instance of the set resources 274A-N. In some embodiments, including the illustrated example, the literal value may be derived from one of a plurality of unique values for a key that is referenced by the logical value of the variable parameter. For example, the logical value may be an executable expression, such as a function call that returns a list of unique values of the key; for each instance of the set resources 274A-N, the system 204 may select a value from the list to be the literal value of the instance's configurable attribute. Additionally, as described herein, the number of values in the list may determine N. In one non-limiting example, the logical value may be an executable expression that accesses a reference set of data objects each having a "color" attribute; the system executes the expression to obtain the list {"red," "green," "blue," "yellow"}, indicating N=4; the system launches, as the set resources 274A-N, four instances from the same resource definition, each having the same configuration except for the configurable attribute, which resolves to "red" for the first instance, "green" for the second instance, "blue" for the third instance, and "yellow" for the fourth instance.

Subsequent to the launch of the set resources 274A-N, the action illustrated in FIG. 2E may occur in response to a management operation (e.g., a stack 270 update or resource set 272 update) requested from the computing device 202 or based on another triggering event, such as receipt by the resource management system 204 of a message generated by a notification service or another system service. For example, such a message may be generated in response to a modification to the reference set of data objects from which the key/value pairs used to resolve the literal value of the configurable attribute. The resource management system 204 may determine that the key and/or one or more of the unique values of the key have been modified. For example, the system 204 may execute the logical value expression to obtain the current list of values for the key, and compare the current list to the list used to launch/manage the set resources 274A-N. In another example, the system 204 may obtain the current list of values and also obtain the set of current literal values of the configurable attribute in the executing instances, such as by accessing a lookup table of the literal values or querying the resource allocation system of the corresponding virtual computing environment; the system 204 may compare the current list to the current literal values to determine which of the current literal values are no longer in the list, and/or which of the unique values in the current list are not represented by the executing instances.

The resource management system 204 may then update the set resources 274A-N to corresponding to (e.g., match) the current list of values. For example, the system may cause an instance associated with a unique value of the key that is no longer in the list to be deleted, removed, stopped, etc. In another example, the system may cause a new instance corresponding to a newly appearing unique value to be launched. The illustrated example illustrates both actions: the current list of unique values of the key may have changed to {"red," "green," "blue," "purple"}, such that Nis still four but "yellow" has been replaced by "purple;" the system 204 may cause the instance of the set resources 274A-N that is associated with "yellow" to be deleted, such that the resource set 272 contains the set resources 274A-(N−1); and, the system 204 launches a new set resource 276, having the configuration of the original set resources 274A-(N−1) with the configurable attribute set to "purple," into the resource set 272.

Figure 2F:
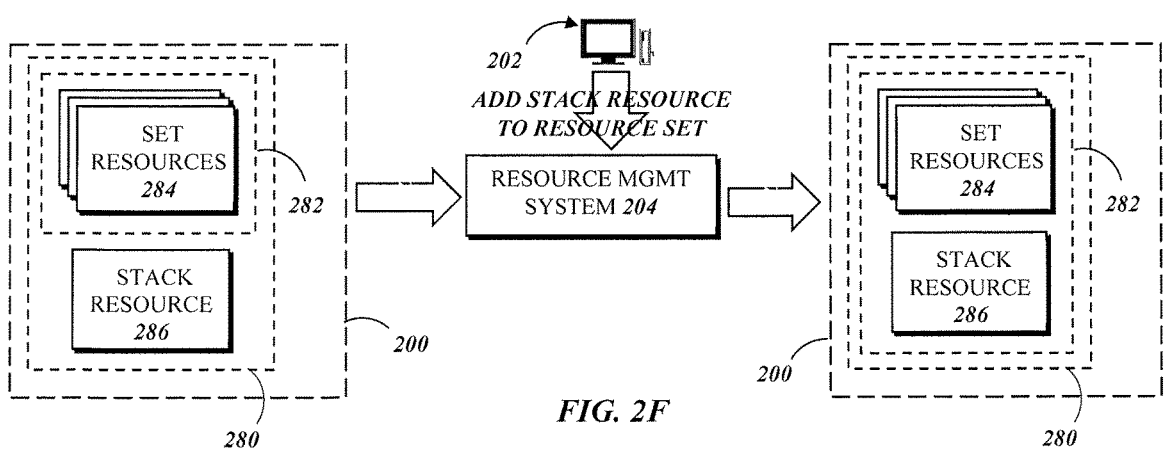

FIG. 2F illustrates another example adoption action, similar to that of FIG. 2B. An existing stack 280 may be updated by adopting a stack resource 286 outside of a resource set 282 into the resource set 282 to be managed as a unit together with the existing set resources 282. In one example, the master template of the stack 280 is updated so that the resource definition for the stack resource 286 is moved into the resource set definition for the resource set 282.

Figure 3:
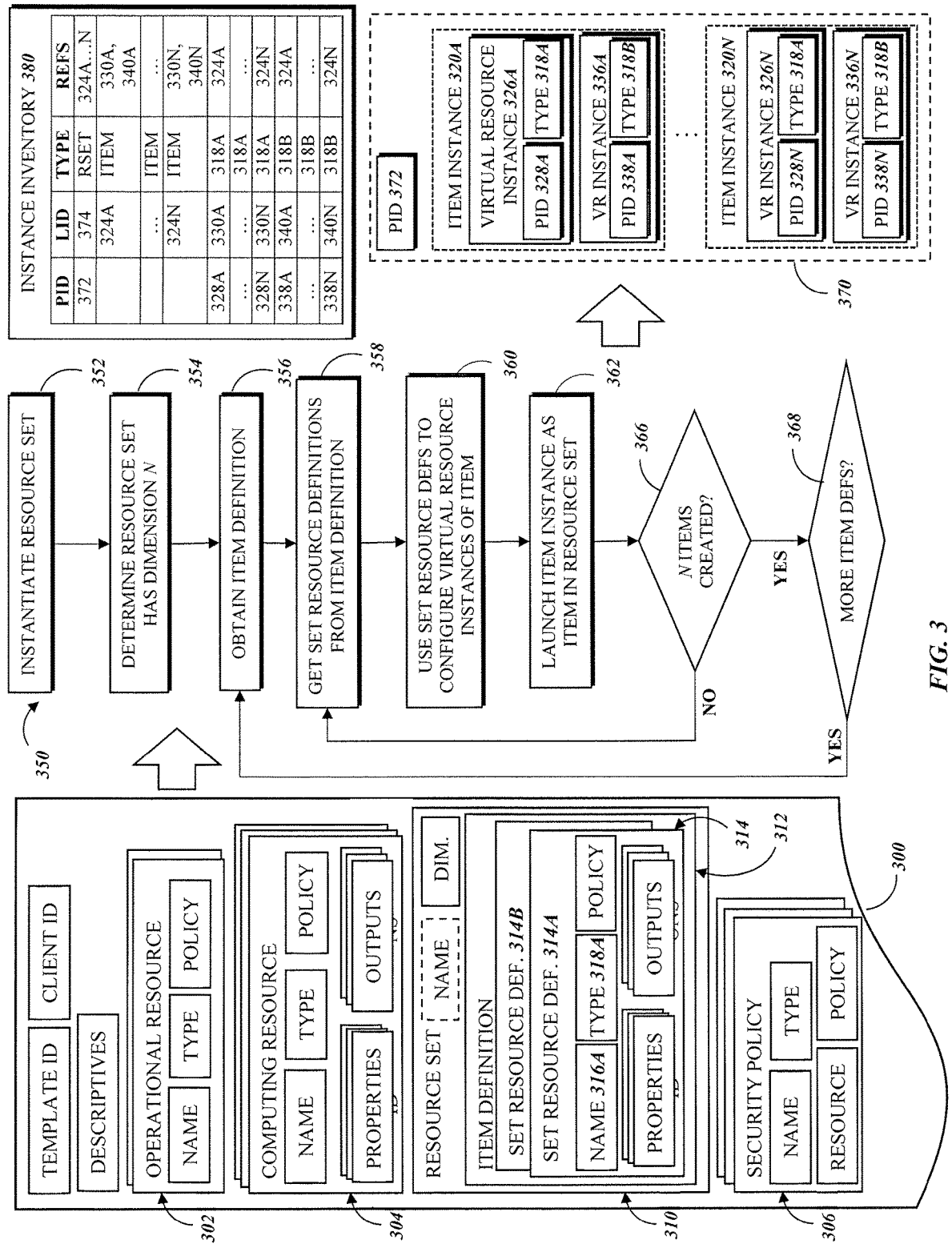
FIG. 3 is a diagram of an example template used to provision and deploy virtual computing resources, an example method of processing the template, and an example resource set produced by a system performing the method.

FIG. 3 illustrates an example template 300 that defines a resource set, and also illustrates an example method 350 of executing the template 300 to create a resource set 370 comprising a number N of item instances 320A . . . N executing in a VCE. The template 300 may be an example of the stack template 124 of FIG. 1. A template may have more or less information than the illustrated template 300; the following description provides some examples of resources that can be defined and launched using a template. A template 300 may include header information such as a template identifier, a user identifier for the user (i.e., client) who owns the template, and one or more fields containing descriptive information such as versioning and text describing what the template 300 is used for. One or more definitions 302, 304, 306, 310, 312, 314 may be included in the template, and each may provide parameters to be included in the configuration of resources created and/or launched from the template 300. In particular, a resource allocation system as described above may be configured to create and configure virtual resource instances from the definitions in the template 300. In one example, the resource allocation system may read a computing resource definition 304 for a virtual machine to determine the type and amount of physical and/or virtual resources to allocate for an instance of the virtual machine. This information may be determined from the properties of the definition 304, such as a virtual machine image file or a plurality of parameters identifying the file system, operating system, runtime environment, number and composition of containers, software program(s) to execute, and the like. The properties may also identify how an associated instance should be connected to the virtual network and/or configured as an endpoint connected to an external communication network. In another example, the resource allocation system may read a security policy definition 306 to create a security policy and attach the security policy to the example virtual machine instance. Non limiting examples of resource definitions include: an operational resource definition 302 including a name, a resource type (e.g., logical container; group scaling policy), and an access policy; a computing resource definition 304 including a name for identifying virtual resource instances launched from the definition 304, a resource type (e.g., virtual machine, data store, message queue, etc.), one or more access control lists or other security sub-policies identifying one or more users and the access permissions they are granted, and one or more properties of the corresponding virtual resource instance; and, a security policy definition 306 including a policy name, policy type, the name of the computing resource the security policy attaches to, and the security policy itself or a reference (e.g., file name) thereto.

The resource definitions of the template 300 further include one or more resource set definitions 310 that provide a resource-repetition capability, while also creating a set model that can be interacted with dynamically in the template (e.g., via intrinsic references). In context of a stack template document structure, a Resource Set definition 310 evaluates to a list value representing the enumeration of the Resource Set item instances 320A-N the instantiated resource set contains. The semantics of the Resource Set type determine the mechanism of enumeration (i.e. array vs. map) in various embodiments; however, the evaluated value may be consistently represented as a list type. A resource set definition 310 may optionally include a name, and further includes a dimension parameter and one or more item definitions 312 each describing a configuration for virtual resource instances that are launched as items (or parts of items) in the resource set.

In some embodiments, an item definition 312 may contain one or multiple set resource definitions 314 each describing a corresponding configuration for virtual resource instances launched using the set resource definition 314. A set resource definition 314 may have the same elements, and may further use the same syntax, as a computing resource definition 304. For example, and as described further below, a resource set definition 314A may have a unique name 316A that can be used to generate a logical identifier for a virtual resource instance, and a resource type 316A that is known to the system. In various embodiments, resource set definitions 314 may have any available resource type, and resource set definitions 314A,B of the same item definition can be disparate types 318A,B. When a system executes the template 300, for each set resource definition 314A,B, the system causes a corresponding virtual resource instance 326A . . . N, 336A . . . N to be provisioned, configured, and deployed; accordingly, each time the template 300 is executed, an item definition 312 containing D set resource definitions 314 will cause the launch, into the resource set 370, of one complete item instance 320A containing D associated virtual resource instances 326A, 336A (D=2 set resource definitions 314A-B in the illustrated example item definition 312).

The dimension parameter determines the number N of each type of item, and correspondingly the number of item instances 320A-N launched with a configuration specified in an item definition 312, that will be contained in the deployed resource set 370. In some embodiments, the value of the dimension parameter may be a fixed integer. When the dimension parameter is a fixed integer defining the "size" of the resource set, array semantics may be used to address specific item instances in the resource set, as well as their constituent virtual resource instances in some embodiments. Example template code for such an embodiment may be:

```
"MyVMFleet": {
    "Type": "WS::Template::ResourceSet",
    "Size": 10,
    "ItemDefinition": {
        "MyVMInstance1": {
            "Type": "WS::VM::Instance",
            "Properties": {
                ...
            }
        }
        "MyVMInstance2": {
            "Type": "WS::VM::Instance",
            "Properties": {
                ...
            }
        }
        "VMFleetGroup": {
            "Type": "WS::SecurityGroup::Instance",
            "Properties": {
                ...
            }
        }
        "VMFleetStore": {
            "Type": "WS::DB::Instance",
            "Properties": {
                ...
            }
        }
    }
}
```

In this definition for the resource set "MyVMFleet," the dimension parameter "Size" has a fixed value of 10 and a single item definition, described by the "ItemDefinition" data structure, includes four set resource definitions for cooperating resources that have varying types: two virtual machine definitions with logical identifiers "MyVMInstance1" and "MyVMInstance2" for launching virtual machine instances with the associated configurations; a security group definition with logical identifier "VMFleetGroup" for controlling requests for access to the virtual machine instances launched from the "MyVMInstance1" and "MyVMInstance2" set resource definitions; and, a database definition with logical identifier "VMFleetStore" for storing data created or accessed by the virtual machine instances. The resulting resource set would contain 20 virtual machine instances, but only 10 items; each of the 10 items would include one virtual machine instance launched from the "MyVMInstance1" set resource definition, and one virtual machine instance launched from the "MyVMInstance2" set resource definition, as well as one "MyFleetGroup" security group instance and one "VMFleetStore" database instance.

Each item launched the same item definition may be identical or substantially identical to the others launched from the same definition. Additionally or alternatively, each virtual resource instance launched from a set resource definition within an item definition may be identical or substantially identical to the others launched from the same definition. An example of "substantially identical" may be that the virtual resource instances may have all the same configuration parameters at launch, except for each instance has (or is assigned) a unique physical identifier. In a variation on this example code, the name of a set resource definition may have a logical value identifier appended thereto in the template (e.g., "MyVMInstance1@[ItemID]", where "@[ItemID]" is the logical value with a varying literal value); at execution, the system may evaluate this logical value and replace it with a literal value based on the addressing semantics. For array semantics, the system may, upon launch of each virtual resource instance, combine the name with the index position of the instance (i.e., selected from integers 0-9) to produce a logical identifier for the instance that is unique from those of the other instances launched from the same set resource definition. Additionally, each of a plurality of set resource definitions in the item definition may have the same logical value identifier in the corresponding name (e.g., "MyVMInstance2@[ItemID]"), such that the system resolves the logical value identifier to the same literal value for each virtual resource instance in an item instance.

In other embodiments, the dimension parameter value may be a list of values, or one or more references to one or more values, or an executable function or expression or other program code that, when executed or evaluated, returns an output comprising one or more values; the number of values may determine the number of items/item instances that will be contained in the deployed resource set 370. These embodiments imply map semantics for the resource set, with the dimension parameter defines or references a set of keys mapping to the virtual resources instances launched as items in the resource set. Additionally, in these embodiments, the dimension parameter may have additional uses. In some embodiments, the dimension parameter may be used to link, bind, or otherwise associate the reference set 370 to another context, data source, set of data objects, or combination of these. For example, the value of the dimension parameter may comprise one or more program expressions, such as executable intrinsic and/or extrinsic functions, reference pointers, or other program code that can be executed, evaluated, or otherwise resolved to obtain data from the target context, data source, or data set.

Additionally or alternatively, the value(s) returned by the dimension parameter may be used to generate unique attributes for one or more of the virtual resource instances 326A-N, 336A-N launched from an item definition 312. Example template code for a resource set "MyVMFleet" in which N is dependent on how many redundant, isolated computing sub-environments, within the computing resource service provider environment in which the VCE is executing, a user is authorized to use for deploying resources, may be:

```
"MyVMFleet": {
    "Keys": { "Fn::GetSubEnvs" : { "Ref" : "SP::Env" } },
    "Type": "WS::Template::ResourceSet",
    "ItemDefinition": {
        "MyVMInstance@[ItemID]": {
            "Type": "WS::VM::Instance",
            "Properties": {
                . . .
            }
        }
    }
}
```

In this resource set definition, the dimension parameter "Keys" contains a program expression, including multiple functions, that must be evaluated to determine the number N of keys in the set and their associated values. An intrinsic self-referential function {"Ref": "SP::Env"} returns an identifier of the computing resource service provider environment in which the VCE is executing; the intrinsic function "Fn::GetSubEnvs" takes this identifier as an argument, to return a list or array of identifiers for each of the sub-environments that the user can access. The number of entries/elements in this list/array is the number N of item instances to launch from each item definition. Each of the N item instances will include a virtual machine instance launched from the "MyVMInstance@[ItemID]" set resource definition, and each of these virtual machine instances will have a unique logical identifier (in map semantics) composed of the fixed name "MyVMInstance" and one of the sub-environment identifiers (replacing the logical value "@[ItemID]").

Valid keys may be any data object type supported in the template document model. This includes primitive types, strings, resource objects, lists of resources, other resource sets, etc. Keys may also be complex types, having multiple attributes that can be referenced in the template code in order to use the corresponding value of the attribute. For example, where the keys are virtual resource instances executing in another resource set, the item definition 312 may include a set resource definition 314 designed to launch virtual machine instances that each have a logical identifier incorporating the physical identifier of one of the instances in the reference set (e.g., "MyVMInstance@[ItemID.PID]", where the physical identifier PID is accessed using the de-referencing dot operator). In order to ensure coherency in the definition of resource sets, one constraint may be enforced across attributes; failure to satisfy this constraint will result in a template validation error.

A set resource definition 314 may be similar to (e.g., may use the same syntax as) a computing resource definition 304, having a name, a resource type, one or more security/access policies (e.g., an access control list), one or more properties, and one or more outputs. In some embodiments, the system executes the item definition 312 N times to launch the N virtual resource instances 326A-N from the corresponding set resource definition 314. In some embodiments, the set resource definition 314 may not contain any variable attributes; in such an embodiment, the virtual resource instances 326A-N may be "copies" of each other, having identical, virtually identical, or substantially similar configurations defined by the set resource definition 314. In one example of "virtually identical" or "substantially similar," only the physical identifiers 328A . . . N of the virtual resource instances 326A-N may be different from each other, due to their being unique for each virtual resource instance 326A-N; all other configuration parameter values may, at least initially (i.e., at launch), be the same. In another example of "virtually identical" or "substantially similar," the configuration parameters of the virtual resource instance that affect the functionality of the instance may be the same across all copies of that virtual resource instance in the resource set; the instances may be considered functionally equivalent. For example, a set resource definition 314 for a virtual machine instance to be configured as a web server may allow for each corresponding instance to have a unique identifier and to otherwise have the same network interface, routing, server software, usage limits, etc., as the other set resource instances launched from the definition 314.

In other embodiments, one or more attributes of the item definition 312 or the set resource definition 314 may be a variable, such that corresponding virtual resource instances 326A-N may have unique attributes. For example, an attribute value associated with a key may be used to define a property in the set resource definition 314 and/or its item definition 312; the attribute value may be accessed in the same manner described above (e.g., using the "@[ItemID.Attribute]" logical value). In some such embodiments, the instances launched from a set resource definition 314 may still be substantially similar (i.e., functionally equivalent). For example, a set resource definition 314 for configuring N virtual machine instances as substantially similar web servers may include a variable attribute identifying a particular one of several end users as the owner of the corresponding instance, while values for operational parameters, such as the VM operating system, server software, installed web application packages, port openings and other networking parameters, and the like, are the same across all instances of the web server within the resource set.

Within the template 300, a resource set 370 defined by the resource set definition 310 can be accessed directly from any point in the template 300 where the set is assumed to have been instantiated. This is at minimum any point in the template 300 after the point where the resource set definition 310 is located. A resource set 370 defined by the resource set definition 310 may be referenced (i.e., in another computing resource definition 304) by name using an intrinsic function. The items within the resource set 370 (i.e., item instances 320A-N) or the virtual resource instances 326A-N, 336A-N they contain can be de-referenced using either array or map access semantics, depending on the way the set was defined. For example, an operational resource definition 302 for assigning a dynamic IP address "MyDIP" to a first virtual resource instance 326A of a first item instance 320A in the resource set 370 with the name "MyResourceSet" may be:
 "MyDIP": {
 "Type": "WS::VM::DIP",
 "Properties": {
 "InstanceId": {"Ref": "MyResourceSet[0]" }
 }
 }

In another example, a template 300 may construct a pseudo-iterative model for items in a first resource set by defining a second resource set to be dependent on the first resource set and to reference specific items in the first set from the second set using either array or map semantics. In yet another example, the intrinsic function can be used to export values out of a resource set or to import values into it. For exports, any data which could be exported when provisioned outside a resource set can also be exported if provisioned through a resource set. Resource sets themselves can also be exported; for example, template programming code to export a resource set "MyVCEResourceSet" defining a set of VCE instances may be:
 "Outputs": {
 "VCEInstances": {
 "Description": "Export for my core VCE instances",
 "Value": {"Ref", "MyVCEResourceSet"},
 "Export": {
 "Name": "CoreVCEInstances"
 }
 }
 }

Note that this will not reduce to a list of items; the array/map semantics of the instances will be maintained when exported.

Values can be imported to resource sets, either in the resource set definition itself or in the item definition within the set. If the latter, the type and dimension of the imported value must match the importing set:
 "MyFleet": {
 "Type": "WS::Template::ResourceSet",
 "Keys": {"Fn:ImportValue": {"CoreVCEInstances"}}
 "ItemDefinition": {
 . . .
 }
 }

Note that in this case, the keys are defined by the items in the imported set. There will be one item instantiated for each element (i.e., instantiated VCE belonging to the user) in the "CoreVCEInstances" set, and it will have the same key (order will not matter).

The use cases for resource sets pivot based on the axes described in Table 1 below. Each axis defines a variation in use cases where resource sets may be used.

TABLE 1

Example Axes Defining Variations of Resource Sets

| Axis | Variations | Description |
| --- | --- | --- |
| Operation | Create | Create a new Resource Set as part of a stack create action. |
|  | Update | Update an existing Resource Set as part of a stack management action. Depending on the change, this may require creation and/or deletion of items in the existing Set. |
|  | Delete | Delete a new Resource Set as part of a stack delete action. |
| Instance similarity | Identical | All instances in the Set are identical from a template definition perspective. All attributes explicitly referenced in the stack template have identical values for each instance in the Set. |
|  | Vary by attribute | Instances in the Set have variations of at least one attribute which is explicitly specified in the resource template. |

TABLE 1-continued

Example Axes Defining Variations of Resource Sets

| Axis | Variations | Description |
|---|---|---|
| Instance hierarchy | Flat | All instances in the Set are individual instances of a single resource type. If a resource type creates other resource types automatically and manages them, this is still considered a simple resource type if only one resource appears in the Set template. |
| | Complex | All item instances in the Set are composed of multiple virtual resource instances. This will happen when the item definition in the resource Set definition of the template contains more than one set resource definition; an item instance comprises one virtual resource instance launched from each of the set resource definitions. |
| | Flat-nested | All instances in the Set are a single instance of a nested stack. |
| | Complex-nested | There are multiple resource definitions in the Set template, at least one of which is a nested stack. |
| Set semantics | Array | The Set size is defined by a sequential linearly-increasing integer starting at zero. |
| | Explicit map | The Set instances are defined by an explicitly-definedset of constant key values. |
| | Bound map | The Set instances are defined by another list or set, which contains items which are bound to the Set as key values. |

Resource Sets are created whenever a stack create operation is executed with a Resource Set definition in the stack template. They are also created whenever a stack update is executed with a new Resource Set definition introduced into the stack template (this does not include updates to an existing Resource Set definition in a resource template). Generally (as in the example method 350), when Resource Sets are created, an entity representing the resource set 370 is instantiated (step 352) in the target VCE. The resource set 370 may store or be assigned a physical identifier 372 used in the VCE to reference the resource set 370. The dimensioning characteristics, such as the number N of item instances launched into the resource set 370 from each item definition 312, may be determined (step 354), and then the virtual computing resources defined in the context of the item definition(s) 312 may be instantiated based on the dimensioning characteristics of the set, as described above. For example, after the item definition is obtained (step 356), the system may obtain the set resource definition(s) from the item definition (step 358). The set resource instance(s) that make up an item may be configured using the configuration described in the set resource definition(s) 314 (step 360), and the item instance may be launched into the allocated physical resources (step 362) as an item belonging to the resource set 370. In some embodiments, such as when the item definition 312 contains only one set resource definition 314, an item instance may be a virtual resource instance. In other embodiments, the item instance may be a plurality of virtual resource instances each launched from a corresponding set resource definition of a plurality of set resource definitions in the item definition. In some embodiments, an item may be instantiated as a logical container having the virtual resource instance(s) launched from the set resource definition(s) associated therewith.

Each item may be instantiated serially or in parallel; in some embodiments, no assumptions may be made about the order of instantiation or the degree of parallelism used. Each item instance 320A-N may include a virtual resource instance 326A-N, 336A-N corresponding to each set resource definition 314A,B, and each virtual resource instance 326A-N, 336A-N may include its corresponding data and metadata, such as resource type 318A,B, values, files, header information, functions, programs, software applications, and the like, as identified in the configuration described in the corresponding set resource definition 314A, B. As the resources are instantiated, metadata records may be created for them in an instance inventory 380 (as described above) and may be updated as needed. For example, a resource set record for the resource set 370 may be created in the instance inventory 380 at step 352. The resource set record may include the physical identifier 372 for the resource set 370, as well as (optionally) a logical identifier 374 (e.g., the name stored in the resource set definition 310) used in the template 300 to reference resource sets created from the resource set definition 310. As items are instantiated (steps 358-362), a corresponding item instance record for each item instance 320A-N may be created in the instance inventory 380. An item instance record may, for example, include or reference a logical identifier 324A . . . N (created, e.g., at step 360) used to address the item instance in the template 300. Additionally, a reference to the item instance 320A-N (e.g., the logical identifier 324A-N therefor) may be added to the resource set record upon instantiation of the item, identifying the item instance as an item in the resource set 370. Additionally or alternatively, a virtual resource instance record for each virtual resource instance 326A-N, 336A-N may be created in the instance inventory 380. Again, the virtual resource instance record for a virtual resource instance 326A-N, 336A-N may include a physical identifier 328A . . . N, 338A . . . N and a logical identifier 330A . . . N, 338A . . . N (created, e.g., at step 360, using the name 316A,B in the corresponding set resource definition 314A,B) of the instance. Each virtual resource instance record may reference the item instance and/or the resource set 370 that it is in, and/or the item instance record and/or the resource set record may reference the virtual resource instances. Other metadata describing each of the instances, such as the instance type, may be stored in an instance record.

Figure 6:
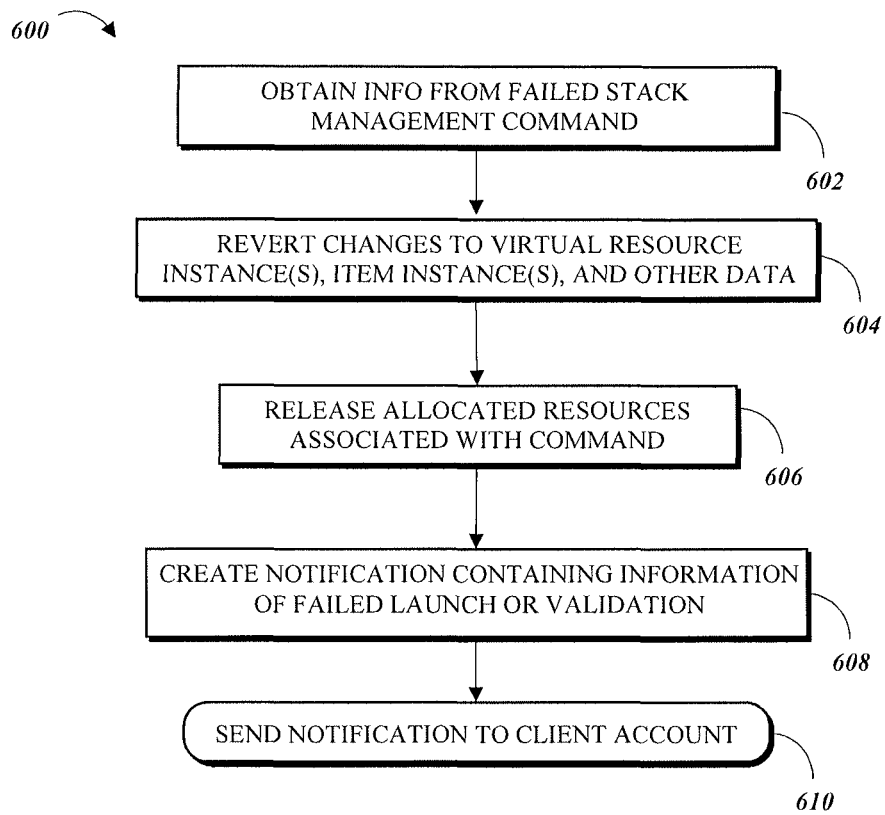
FIG. 6 is a flowchart of an example method of processing a stack deployment failure in accordance with the present disclosure.

If the system fails to provision all instances implied by the Resource Set definition, stack creation/updating will fail and trigger a rollback if appropriate (see FIG. 6). If N item instances have not been launched from the item definition 312 (checked at step 366), the instantiation starting at step 358 may be repeated. After N item instances are launched, if there are more item definitions 312 in the resource set definition 310 (checked at step 368), the system may get the next item definition (step 356) and repeat the instantiation process.

Figure 4A:
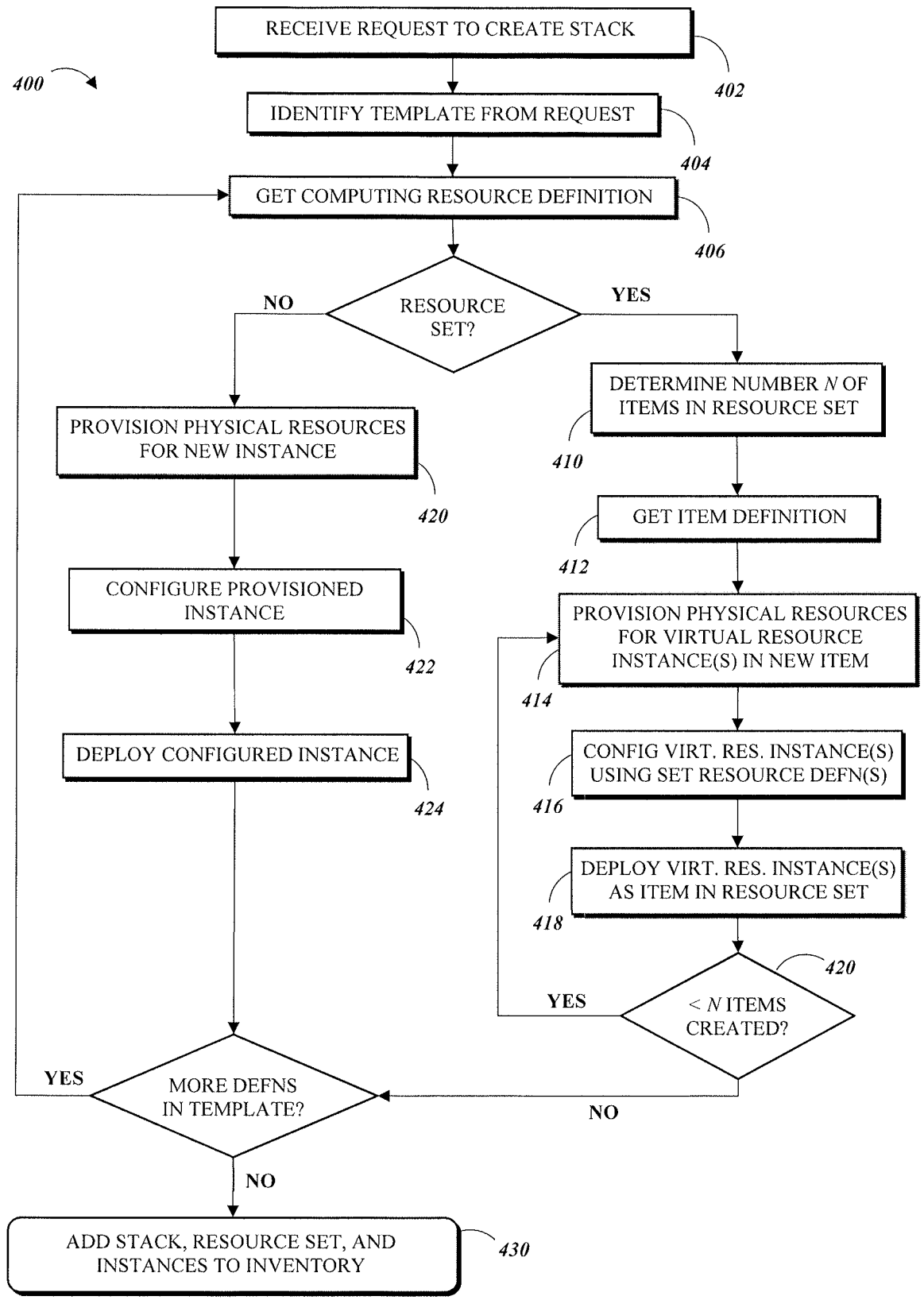
FIG. 4A is a flowchart of an example method of creating a resource set and its corresponding virtual computing resources in a new logical container, in accordance with the present disclosure.

FIG. 4A illustrates an example method 400 that the system(s) of FIG. 1, for example, may perform to launch a resource set into a logical container, such as a stack that can be instantiated in a VCE. At step 402, the system may receive a request to create a new stack. The new stack may include new virtual resources originally defined by, and launched from, computing resource definitions in the stack template, including at least one resource set and a plurality of virtual resource instances that are items (or parts of items) of the resource set. The request(s) may come from the user associated with the virtual resources, such as via an administrator API, or the system may receive a request from an end user connected to the system via an end user API, or another event occurring in the system may trigger the request. The request may include information that allows the system to, at step 404, identify the stack template. For example, the request may include a stack identifier that the system may use to access a template database and obtain the template associated with the stack identifier.

At step 406, the system may identify a first computing resource definition from the template. The computing resource definition may be for a stack resource, or may be a resource set definition. If it is a resource set definition, at step 410 the system may determine the number N of each item (or of each type of item, if there are multiple item definitions) that will be launched into the resource set. For example, the system may read the dimension parameter of the resource set definition to determine N. At step 412, the system may obtain a first item definition from the resource set definition. At step 414 the system may provision physical computing resources into which an item's virtual resource instance(s) (e.g., a virtual resource instance for each of the set resource definitions in the item definition) will be launched; at step 416, the system may apply the configuration defined in the set resource definition(s) of the item definition to produce the virtual resource instance(s); and at step 418, the system may deploy the virtual resource instance(s) into the VCE as an item (i.e., item instance) in the resource set. For example, the system may communicate with the resource allocation system of the VCE to create the new virtual resource instance(s), and upon successful creation, the system may add metadata records to the instance inventory as described above. At step 420, the system may determine whether it has launched N item instances (i.e., N virtual resource instances for each of the set resource definitions) from the item definition. If not, the system returns to step 414. If so, the system may process the next computing resource definition (step 406), if any, or may, at step 430, add the new stack, resource set(s), and virtual computing instances (including new stack resources and resource set items) to the instance inventory.

If the computing resource definition identified at step 406 is for a new stack resource, at step 420 the system may provision virtual computing resources in the VCE for launching a new virtual resource instance from the stack resource definition. At step 422, the system may configure the new virtual resource instance using the configuration identified in the stack resource definition of the template. At step 424, the system may deploy the new virtual resource instance into the VCE. In one embodiment, all of the stack resource definitions may be executed to create associated new instances. Any of the steps of processing the computing resource definitions of the template may fail to complete, in which case a failure process 600 of FIG. 6 is initiated to roll back any changes made during execution of the method 400.

Figure 4B:
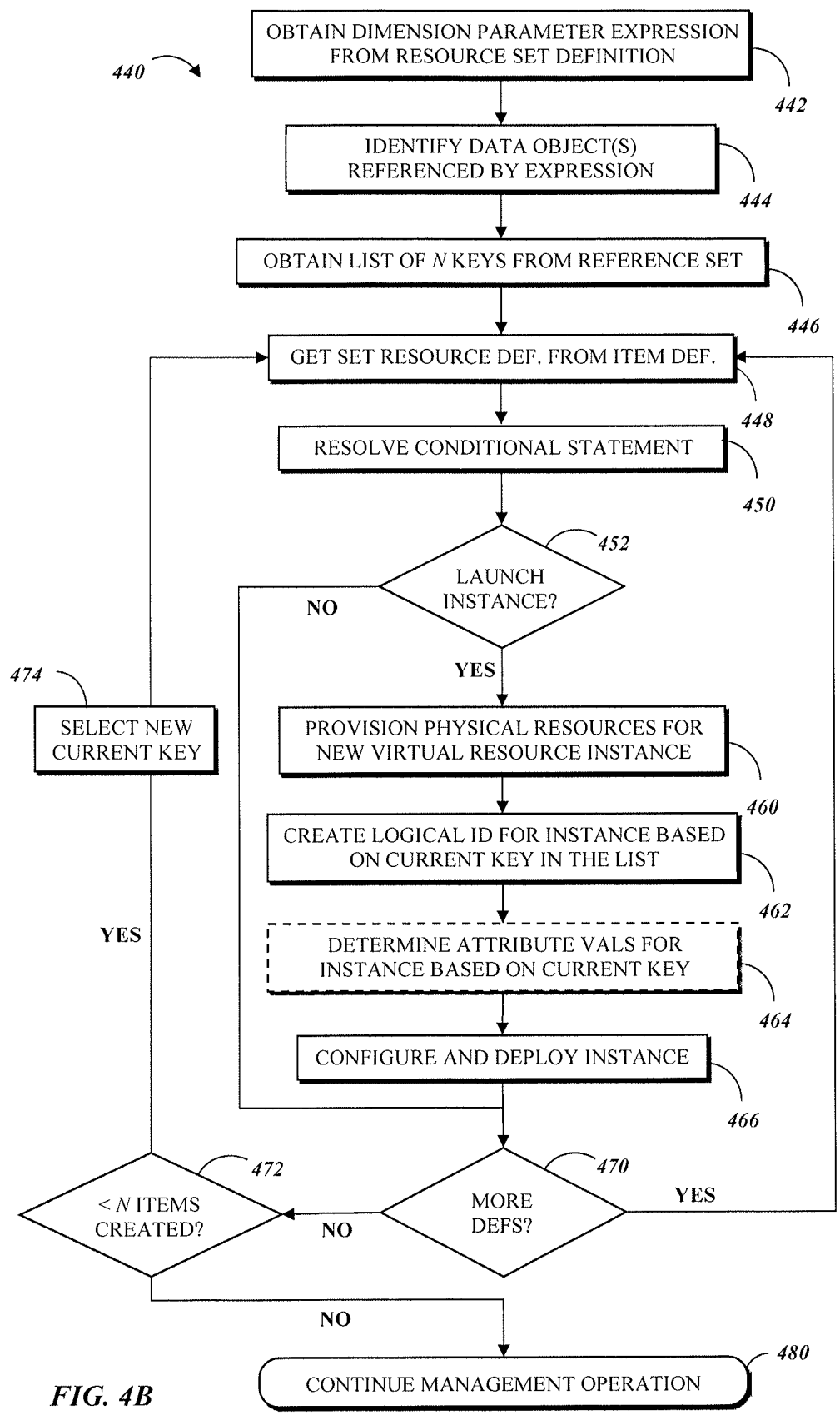
FIG. 4B is a flowchart of an example method of processing a resource set definition, in connection with the method of FIG. 4A, to bind the resource set to another data set.

FIG. 4B illustrates an example method 440 of obtaining keys and the set dimension N for a resource set that is linked, bound, or otherwise logically connected to a reference set of data objects as described above. At step 442, the system may obtain the dimension parameter from the resource set definition, and at step 444 the system may use the dimension parameter to identify the referenced data object or set of data objects that is/are used to determine the dimension parameter value. At step 446, the system may obtain the keys and determine the set dimension N by evaluating the value or expression of the dimension parameter. In some embodiments, the values associated with data objects in the reference set may be coded directly into the reference set definition; these values may be the keys. For example, if the reference set contains all accessible sub-environments as described above, and the template programmer knows the identifiers of the sub-environments, a list of those identifiers may be stored as the value/expression of the dimension parameter. In another example, the values are obtained by executing one or more functions, stored as the dimension parameter expression, as described above. The keys (or key/value pairs) may be obtained in a list or array, and the system may count the entries/elements of the list/array to determine N.

At step 448, the system may obtain one of one or more set resource definitions in an item definition of the resource set definition. In some embodiments, the set resource definition may be associated with a conditional statement that the system may, at step 450, resolve to determine whether to launch a virtual resource instance from the set resource definition; the conditional statement may be a "global" statement defined at the resource set definition level, or may be item-specific (i.e., defined in the item definition), or may be resource-specific (i.e., defined in the set resource definition. A conditional statement may depend on the keys and/or key values of the reference set of data objects. In some embodiments, a conditional statement may be an expression stating that if the selected key/key value is a certain value, the item should not be instantiated with a virtual resource instance launched from the set resource definition. Thus, at 452, the system determines from the resolved conditional statement whether or not to launch one or more instances from the selected set resource definition. For example, a first set resource definition may include a conditional statement instructing the system not to launch a corresponding virtual resource instance for a key with value "red;" the list of N keys obtained at step 448 may be {"red," "green," "blue," "yellow" }, such that N=4; the system may instantiate the item from the item definition four times, but only three item instances will include a virtual resource instance launched from the first set resource definition.

In other embodiments, a conditional statement may be an expression stating that if the selected key/key value is a certain value, the item should be instantiated with multiple virtual resource instances launched from the set resource definition. In an item definition containing multiple set resource definitions, the conditional statement may apply to one, some, or all set resources; this may produce heterogeneous or asymmetrical item instances having different numbers of virtual resource instances in them. Extending the above example, a second set resource definition may not include any conditional statement; the system instantiates the item four times, and all four have a virtual resource instance launched from the second set resource definition, while one of the item instances does not have a virtual resource instance launched from the first set resource definition.

If there is no conditional statement, or the conditional statement resolves to instruct the system to launch at least one virtual resource instance, at step 460 the system may provision physical computing resources for a new virtual resource instance to be launched from the set resource definition. At step 462, the system may create a unique name or logical identifier for the new virtual resource instance. As described above, the system may select one of the keys from the list/array (which has not already been used to create a logical identifier) as the "current" key to be associated with the virtual resource instance being provisioned, and the system may create the logical identifier based on or including the current key. For example, a logical identifier may comprise the name stored in the set resource definition combined with the value for the current key. At step 464, optionally, the system may determine any unique value(s) for one or more configurable attributes/properties of the virtual resource instance that are defined (i.e., in the set resource definition) to have a variable value based on the value of the current key. At step 466, the system may apply the configuration described in the set resource definition to the virtual resource instance, and deploy the virtual resource instance into the allocated physical computing resources. The configuration may include the logical identifier generated at step 462, which can then be used in the template to distinguish the item instance, and/or the virtual resource instances it contains, from other item instances launched from the same item definition.

At step 470, the system may determine whether the item definition includes any more set resource definitions that have not been processed. If so, the system returns to step 448 to obtain the next set resource definition. If all set resource definitions have been processed, at step 472 the system may determine whether N item instances have been launched from the item definition. If not, the system continues to deploy more item instances by selecting another key as the current key (step 474) and returning to step 448. If so, at step 480 the system continues performing the present management operation (e.g., by returning to step 406 of FIG. 4A).

Figure 5A:
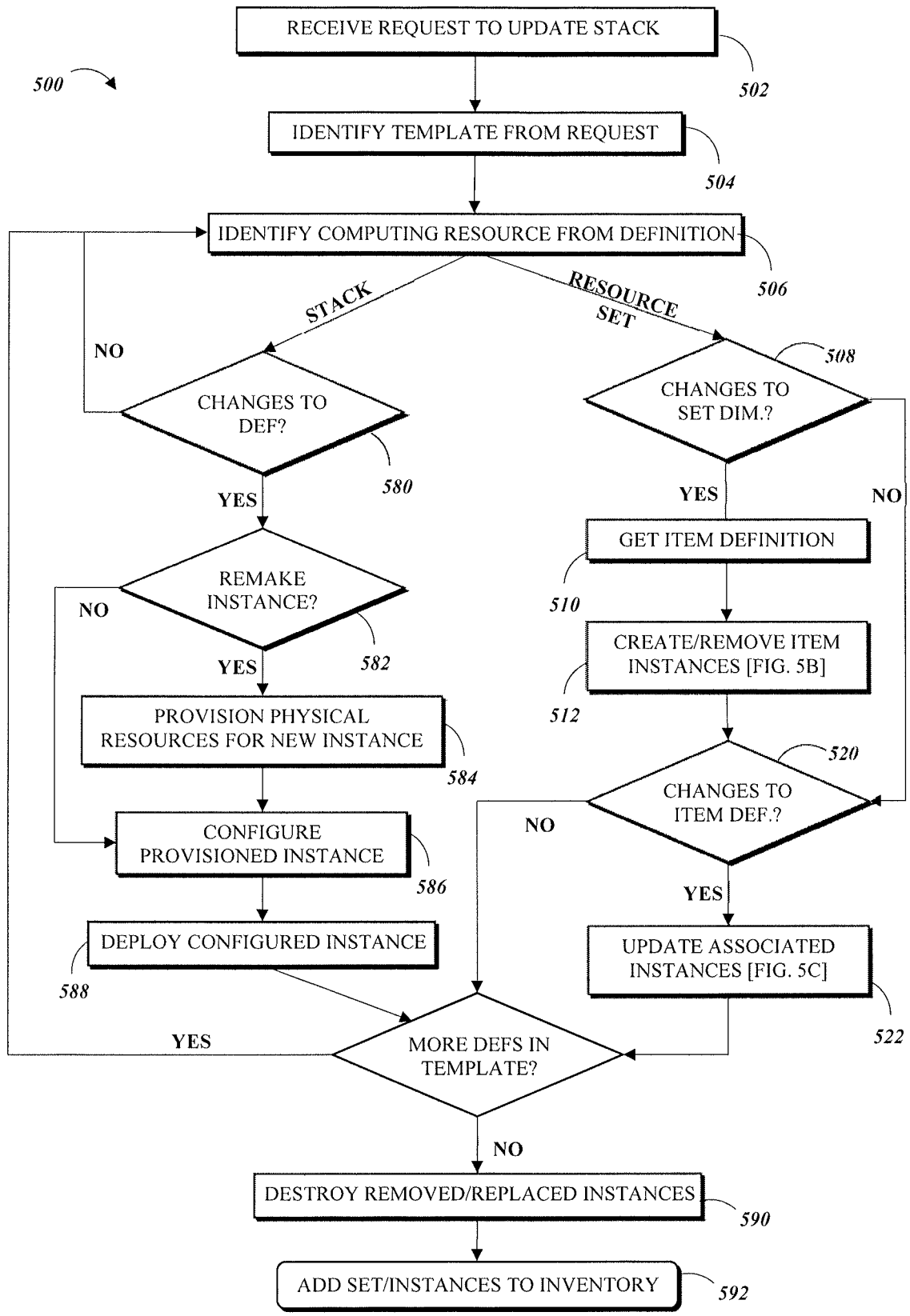
FIG. 5A is a flowchart of an example method of updating a resource set and its corresponding virtual computing resources in an existing logical container, in accordance with the present disclosure.
Figure 5B:
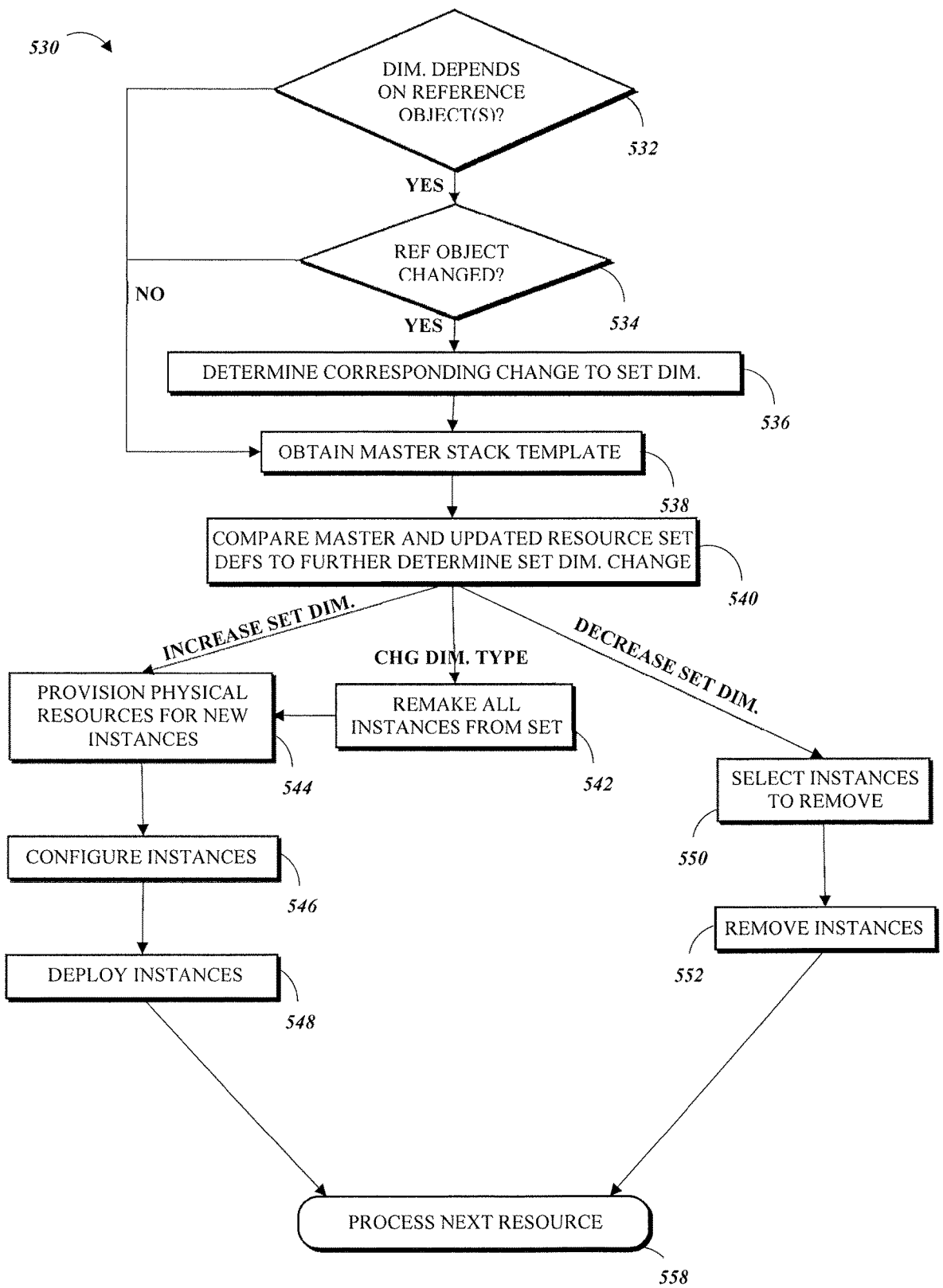
FIG. 5B is a flowchart of an example method of processing, in connection with the method of FIG. 5A, an update to the resource set in which the set dimension is to be changed.
Figure 5C:
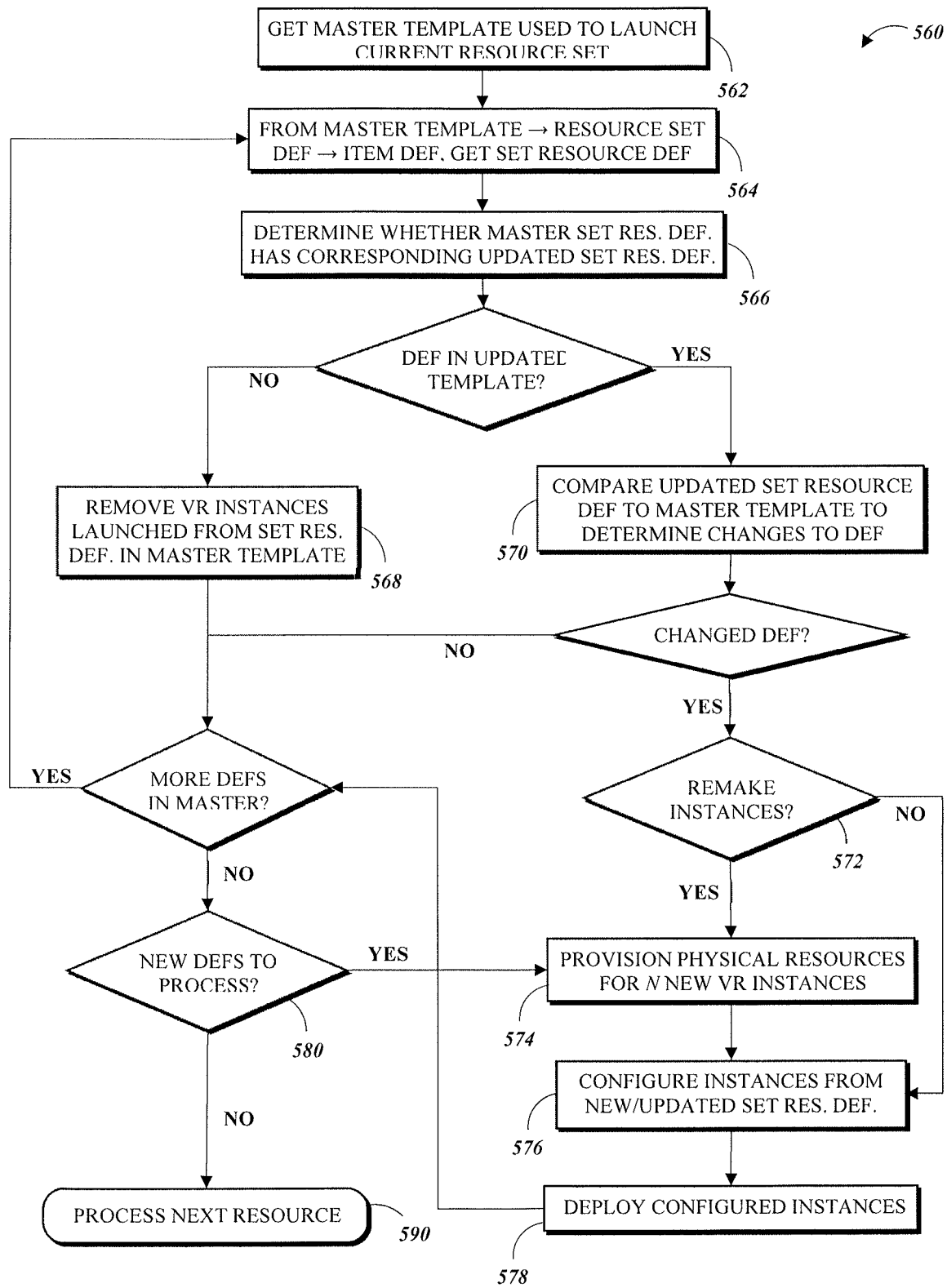
FIG. 5C is a flowchart of an example method of processing, in connection with the method of FIG. 5A, an update to the resource set in which an item definition of a set item is to be changed.

FIGS. 5A-C illustrate update operations that modify a resource set already executing in a stack. Update operations to Resource Sets may cause the set to be reconstructed based on the nature of the change. In general, an update operation will generate a projection of the desired state of the set. Set items which do not exist (i.e., are not instantiated) in the current resource set, but are implied by the projection, will be created and added to the set. Set items which exist in the current set, but do not exist in the projection, will be deleted. Items which exist in both, as identified by identity values, will be updated with any changes in the item definition used to launch the item instances. Deletion of a resource set will cause deletion of all contained resources (i.e., item instances and the virtual resource instances they contain). Update and delete actions on individual resources will be subject to the behavior implied by the resource's policy settings.

FIG. 5A depicts an example general method 500 in which the system, at step 502, receives a request to update the stack in which a resource set is executing. The stack may include virtual resource instances originally defined by, and launched from, computing resource definitions in the stack template; these virtual resource instances may be executing (as members of the stack) in the VCE, and may include items of a resource set. The stack may be updated to change, delete, or add stack resources. The request(s) may come from the user associated with the virtual resources, such as via an administrator API, or the system may receive a request from an end user connected to the system via an end user API, or another event occurring in the system may trigger the request. The request may include information that allows the system to, at step 504, identify a template containing computing resource definitions for the stack resources, including a resource set definition and its item definitions and set resource definitions. For example, the request may include a stack identifier that the system may use to access a template database and obtain the template associated with the stack identifier.

At step 506, the system may identify a first computing resource definition from the template. The computing resource definition may be for a stack resource, or may be a resource set definition. If the computing resource definition is a resource set definition, at step 508 the system may determine whether the update operation includes a change to the set dimension of the resource set that is currently executing. The change may be an explicit change to the set dimension, reflected in the resource set definition of the updated template, or the change may be caused by a change to the data object(s) that is/are referenced in the dimension parameter expression. See FIG. 5B. Processing changes to the set dimension may require the system to obtain each of the item definitions from the resource set definition (step 510) and use them to create or remove item instances (step 512, and see FIG. 5B) so that the number of item instances executing in the resource set matches the new set dimension. After processing the set dimension change, or if there is no set dimension change, at step 520 the system may determine whether the updated template contains any changes to the item definition(s) (i.e., compared to the "master" template used to launch the item instances); if so, at step 522 the system may update the item instances launched from the changed item definition(s). See FIG. 5C. After the resource set changes are processed, or if there are no changes, the system may return to step 506 if there are more resource definitions to evaluate.

If the computing resource definition identified at step 506 is for a stack resource, at step 580 the system may determine whether the stack update operation includes any changes to the identified resource definition. For example, the system may compare the updated stack template to the previous stack template used to launch or update the virtual resource instance associated with the identified resource definition. If there are no changes, the system may identify the next computing resource definition (step 506). If there are changes, at step 582 the system may determine whether the changes to the resource definition require the launch of a new virtual resource instance, either from a new computing resource definition or from an updated definition that requires the associated instance to be restarted and/or remade. For example, an update to an existing virtual machine definition may include a new version of the operating system, requiring the system to de-provision the executing instance and launch a new one with the new configuration.

If a new instance is needed, at step 584 the system may provision virtual computing resources in the VCE for launching a new virtual resource instance from the updated stack resource definition. If a new instance is not needed, or after the new instance has been provisioned, at step 586 the system may configure the virtual resource instance using the configuration identified in the updated stack resource definition of the template. At step 588, the system may deploy the new and/or reconfigured virtual resource instance into the VCE. After the resource definition changes are processed, or if there are no changes, the system may return to step 506 if there are more resource definitions to evaluate. Once all computing resource definitions have been evaluated for updates, at step 590 the system may perform cleanup operations such as destroying virtual resource instances that were replaced, and otherwise releasing allocations of resources that are no longer needed. At step 592, the system may add or update records for each of the virtual resource instances to indicate they are members of the stack and items in the resource set (if applicable), such as by updating an instance inventory maintained by the system as described above; alternatively, this update to the instance inventory may be performed each time a resource is instantiated or an existing instance is deleted or changed.

FIG. 5B illustrates an example method 530 for determining whether the update operation being processed (as in FIG.

5A) requires a change to the set dimension of a resource set, and updating the resource set accordingly. At step 532, the system may determine whether the dimension of the resource set is dependent on any properties, such as the dimension, of a data object or set of data objects. For example, the system may obtain the dimension parameter of the corresponding reference set definition and determine whether the corresponding dimension parameter expression is configured to obtain data from another context, and whether that data comprises a list, set, or array of elements that are counted to determine the set dimension. If so, at step 534 the system may determine whether there have been changes to the referenced data object(s) that might cause the previous resource set dimension to change. If so, at step 536 the system may determine the change (i.e., increase or decrease) to the set dimension that is necessitated by the change to the referenced data object(s). For example, if the reference in the dimension parameter expression is to a data element or expression that maintains or can obtain a count of authorized sub-environments, and at the time the resource set was launched there were three authorized sub-environments, the set dimension at launch was N=3 and there are three item instances executing in the resource set; if at the time of the update the expression is evaluated (step 534) to determine that there are now five authorized sub-environments, at step 536 the system compares the number of authorized sub-environments and the number of executing item instances, and determines that the set dimension must increase by two. The change to the set dimension determined at step 536 may be retained (e.g., in temporary memory).

Afterward, or if the set dimension is not bound to a referenced data object, or if the reference set dimension did not change, at step 538 the system may obtain the master template currently used as the source of truth for the stack. At step 540, the system may compare the resource set definition of the master and updated templates to determine whether any further change to the set dimension is needed. For example, if the dimension parameter is a fixed integer in both templates, and is not equal between the templates, the set dimension must be updated to the new value. In another example, if the dimension parameter is an integer size in the master template and a set of variable keys in the updated template, the system detects the change in set dimension type. Based on the outcomes of steps 536 and 540, the set dimension may need to be increased or decreased and/or have its dimension type changed.

If the set dimension is increased (e.g., the Size attribute is increased in magnitude, or the Keys attribute evaluates to a superset of the key set from the master template), then more items must be added to the Resource Set. New resources will be provisioned based on each item definition as in the set creation case. Thus, at step 544 the system may provision virtual computing resources in the VCE for launching a new virtual resource instance from each set resource definition in the item definition. At step 546, the system may configure the virtual resource instance using the configuration identified in the corresponding set resource definition. At step 548, the system may deploy the new virtual resource instance into the VCE. If the set dimension is decreased (e.g., the Size attribute is decreased in magnitude, or the Keys attribute evaluates to a subset of the previous key set), then some items must be removed from the Resource Set. At step 550, the current set of ItemIDs may be compared to the projected set of ItemIDs to determine the item instances to delete, and at step 552 the items identified as the difference may be deleted. If any resource provisioning or deletion action fails, the stack update action will fail and trigger a rollback (FIG. 6) as appropriate. This will not affect resources which existed before the stack update was initiated.

If the dimension type of the set dimension changes (i.e., from fixed "size" to variable "keys" or vice versa), at step 542 the system may determine that all item instances in the resource set must be replaced. The system may proceed to step 544 to provision new item instances based on the updated template. At step 558, once the change to the resource set dimension has been processed, the system may proceed to processing the next computing resource (or processing any changes to the item definition, as described below with respect to FIG. 5C).

In some embodiments, if a Resource Set (A) is used to define the values of the Keys attribute in another Resource Set (B), any alteration to A will cause update semantics to B. The semantics will be in terms of changes to the Keys dimension in B, as well as direct updates to any resources in B with attributes bound to attributes in A via the "@[Keys]" or "@[Keys.*]" syntax. These scenarios will translate into the appropriate update semantics described above, possibly include more than one update semantic. Additionally, if bound attributes in B have identifying formation changed (or attributes which require replacement), the respective instances may be deleted and re-created. This can have a cascading effect if B is accessed via the Ref intrinsic function in other areas of the template. More generally, at steps 534 and/or 536 the system may determine that there is no change to the set dimension based on the change to the reference data object(s) (i.e., identified at step 534). This may indicate, for example, that there are changes to the keys or key values used to determine configurable attributes as described above (e.g., with respect to FIG. 2E), but the total number keys/values did not change. This may cause the system to process both a decrease and an increase of the set dimension, to effect the replacement or update of any virtual resource instances whose configurable attributes are affected by the reference data object modifications. For example, if a single key value is changed, the system may select the corresponding instance for removal (step 550) and cause the instance to be removed (step 552), and then provision (step 544), configure (step 546), and deploy (step 548) a replacement instance corresponding to the new key value.

FIG. 5C illustrates an example method 560 for updating a resource set in response to changes to the resource set definition (other than set dimension changes) or to one or more of the item definitions. At step 562, the system may obtain the master template, and at step 564 the system may get a set resource definition from the item definition in the resource set definition of the master template. At step 566, the system may determine whether the set resource definition of the master template has a corresponding set resource definition in the updated template. For example, the system may obtain the name of the master set resource definition and determine whether a set resource definition in the updated template has the same name. If the "master" set resource definition no longer exists in the item definition of the updated template, the virtual resource has been removed from the resource set. At step 568, the system may deactivate and remove the virtual resource instances executing in the VCE that were launched from the deleted set resource definition. The system may then obtain the next set resource definition (step 564) from the item definition of the resource set definition in the master template, if any definitions have yet to be processed.

If the set resource definition is found in the master template's item definition, at step 570 the system may compare the corresponding set resource definitions of the master and updated templates to identify any changes to the set resource definition. If there are no changes in the updated set resource definition, the system may move to the next unprocessed resource definition (step 564 or 580). If there is at least one change to the set resource definition, at step 572 the system may determine whether the change(s) to the set resource definition require the launch of new instances, such as new virtual resource instances from the updated set resource definition to replace the virtual resource instances launched from the old set resource definition.

If new instances are needed, at step 574 the system may provision physical computing resources in the VCE for launching N (i.e., the set dimension) new virtual resource instances from the updated set resource definition. If a new instance is not needed, or after the new instances have been provisioned, at step 576 the system may configure the virtual resource instance(s) using the configuration identified in the new or updated set resource definition. At step 578, the system may deploy the new and/or reconfigured virtual resource instance into the VCE. The system may then check for more set resource definitions to process (and return to step 564 if so). In some embodiments, if there are no more definitions to process in the master template, at step 580 the system may determine whether the item definition of the resource set definition in the updated template includes a "new" set resource definition that is not present in the master template. In one example, the system may identify as a new set resource definition any set resource definition that has not been processed after all set resources definitions in the master template's item definition have been processed. In another example, the system may obtain the name of the "updated" set resource definition and determine whether any of the master template's set resource definitions have the same name; if there are no matches, the set resource definition is new. If the set resource definition is indeed entirely new to the resource set's item definition, the system may proceed to provisioning virtual resource instances (step 574) from the new set resource definition. Once all set resource definitions in the item definition of the master and updated templates have been processed, the system may move to the next resource definition in the updated template (step 580).

FIG. 6 illustrates an example method 600 of processing a failure to execute a step during a management operation in the presently described systems. At step 602, the system may obtain information describing the failed management operation. At step 604, the system may revert, undo, delete, or otherwise roll back the execution of any changes that were already performed in response to the request. This can include deleting new data and metadata in records, such as instance inventory records for new or modified instances. This can also include deactivating and de-provisioning virtual resource instances that have already been deployed into the VCE. For example, a stack create operation may have caused the system to successfully create a new resource set with item instances executing in the VCE, when a creation of another stack resource fails; the system may essentially walk back the creation methods described above to tear down and remove the virtual resource instances of the item instances, and then the item instances themselves, and then the resource set. At step 606, the system may release any physical and/or virtual computing resources that have been allocated and are associated with the request. For example, where there are multiple virtual resource instances associated with a resource set, and one or more of the virtual resource instances has already been provisioned and/or deployed, the system may identify any provisioned and/or deployed instances associated with the request, terminate such instances, and remove or destroy any data links to the request, such that the resources are returned to an available resource pool. At step 608, the system may create a notification containing any of the information obtained regarding the failure to execute the request, and at step 610 the system may deliver the notification to the client user, such as by storing the notification in a usage log or sending an email, push notification, or other alert containing the notification to a client user device. Subsequently, the client user may access the system (e.g., via the administrator user interface) and correct the errors reported in the notification.

In cases where existing resources need to be incorporated into Resource Sets, the system may insert the existing resources into the set without deleting and re-creating the inserted instances or the existing item instances in the resource set. For adoption of stack resources into a resource set, the client can supply a metadata attribute which lists a set of logical IDs for resources which are defined in the stack, which should be added to a specific Resource Set. The metadata definition will identify the Resource Set, and the list of logical IDs. This list will be used to populate the set, before instantiation of new resources using the ItemDefinition. It is expected that the stack dimension will be updated to accommodate the new items. If not, a stack update failure will occur. It is also expected that the template definitions for the pre-existing resources will be deleted from the template. A stack update failure will be triggered if the metadata list contains a logical ID which belongs to a resource which is defined outside of the target Resource Set. Once the adoption is completed, the metadata can be removed without impact. For adoption of resource outside of the stack into the resource set, the client can use any suitable resource adoption mechanism. By specifying the logical resource of the Resource Set as the target of adoption, the system may identify the target of an adoption action. In some embodiments, the Resource Set dimension must be updated to accommodate the adoption as part of the same stack management action, otherwise a failure will occur.

Figure 7:
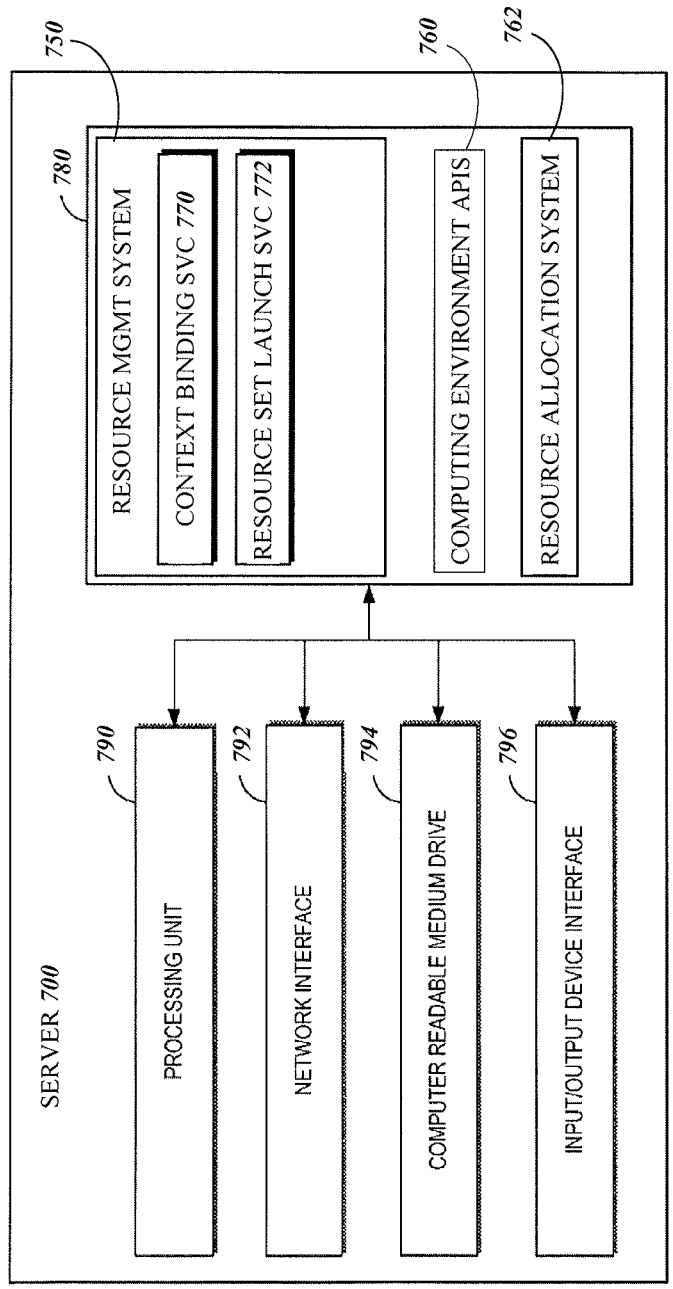
FIG. 7 is a diagram of a hardware computing device implementing the systems and methods of the present disclosure.

FIG. 7 depicts a general architecture of a computing system (referenced as server 700) that processes requests to allocate virtual computing resources to a user in a computing environment as described above. The general architecture of the server 700 includes an arrangement of computer hardware and software modules that may be used to implement aspects of the present disclosure. The hardware modules may be implemented with physical electronic devices, as discussed in greater detail below. The server 700 may include many more (or fewer) elements than those shown in FIG. 7. It is not necessary, however, that all of these generally conventional elements be shown in order to provide an enabling disclosure. Additionally, the general architecture illustrated in FIG. 7 may be used to implement one or more of the other components illustrated in the preceding Figures, including the resource allocation system, the resource management system, and the various electronic data stores and services, each of which may be implemented in the same or a separate architecture from the others.

As illustrated, the server 700 includes a processing unit 790, a network interface 792, a computer readable medium drive 794, an input/output device interface 796, all of which may communicate with one another by way of a communication bus. The network interface 792 may provide connectivity to one or more networks or computing systems. The processing unit 790 may thus receive information and instructions from other computing systems or services via a communication network. The processing unit 790 may also communicate to and from memory 780 and further provide output information for an optional display (not shown) via the input/output device interface 796. The input/output device interface 796 may also accept input from an optional input device (not shown).

The memory 780 may contain computer program instructions (grouped as modules in some embodiments) that the processing unit 790 executes in order to implement one or more aspects of the present disclosure. The memory 780 generally includes RAM, ROM and/or other persistent, auxiliary or non-transitory computer-readable media. The memory 780 may include computer program instructions and other information for implementing aspects of the present disclosure. For example, in one embodiment, the memory 780 implements a resource management system 750, a resource allocation system 762, and one or more computing environment APIs 760 that may be executed by the processing unit 790 to enable the resource management system 750 to access and otherwise communicate with the network-accessible services systems described above. In addition, the memory 780 may include and/or communicate with one or more data repositories (not shown), for example, to access usage data, user data, a security model, security policies, and the like.

The resource management system 750 may include several services implemented in hardware, software, or a combination thereof, and communicating with various other services and with physical (e.g., hard drives) or virtual resources (e.g. logical drives) to obtain, create, delete, and analyze data according to the resource management processes being performed. In some embodiments, a different service 770, 772 may process each different type of data needed to perform the resource set creation and management tasks, although in other embodiments services may be consolidated, or unused if the corresponding type of data is not collected or analyzed. A client may authorize the services to access virtual resources associated with the client's user account, so that the services can obtain private and/or remote data.

In various examples, a context binding service 770 may be invoked to evaluate a function, reference, or other program expression in a resource set definition, in order to obtain data from a reference set in a context distinct from the resource set's context, as described above. A resource set launch service 772 may communicate with the resource allocation system 762 of a target virtual computing environment in order to create and delete virtual resource instances and configure them according to the item definitions in the resource set definition. The resource set launch service 772 may additionally or alternatively access memory 780 or another data store to create, read, and update the resource set record as described above.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Thus, in one aspect, this disclosure provides a system including one or more processors and memory storing computer-executable instructions that, when executed by the one or more processors, cause the system to: receive a request to perform a management operation on a logical container, the system managing, as a unit, virtual computing resources identified as members of the logical container; obtain a first template including program code readable by the one or more processors to define the logical container and a resource set contained by the logical container in a virtual computing environment associated with a user of a computing resource service provider, the first template including a resource set definition describing the resource set and including a first parameter associated with a size of the resource set, the size quantifying the virtual computing resources that the resource set is configured to contain, and an item definition describing a first configuration for an instance of the virtual computing resources that executes in the virtual computing environment; communicate with a resource allocation system of the virtual computing environment to create, in cooperation with the resource allocation system and using the resource set definition, the resource set in the logical container in the virtual computing environment; determine, using the first parameter, that the resource set is configured to contain N items each comprising one or more virtual resource instances; cause the resource allocation system to create N first virtual resource instances in the virtual computing environment, each of the N first virtual resource instances configured according to the first configuration; create a resource set record associated with the resource set and defining the N items of the resource set as each comprising a corresponding first virtual resource instance of the N first virtual resource instances; and, store the resource set record in an electronic data store in communication with the one or more processors and accessible by the user via a user device.

The first parameter may identify a reference set of keys, and the instructions, when executed by the one or more processors, may further cause the system to: generate N logical identifiers each associated with a corresponding key of the N keys; receive, from the resource allocation system, N physical identifiers each used by the resource allocation system to identify a corresponding first virtual resource instance of the N virtual resource instances; and store, in the resource set record, information associating each logical identifier of the N logical identifiers with a corresponding physical identifier of the N physical identifiers. The resource set and the N first virtual resource instances may execute in a first context of the virtual computing environment, the first parameter may include a program expression for accessing data in a second context distinct from the first context, the item definition may include a name that is unique to the N items of the resource set that are created from the item definition, and the instructions, when executed by the one or more processors, may further cause the system to: resolve the program expression to obtain a list of the N keys and N values describing the data in the second context, each value of the N values associated with a corresponding key of the N keys; and, to generate a first logical identifier of the N logical identifiers, combine the name with a first value of the N values to produce, as the first logical identifier, a string of characters.

The first parameter may include a program expression for accessing a plurality of data objects of a reference set associated with a data source, and the instructions, when executed by the one or more processors, may cause the system to: to determine that the resource set is configured to contain N virtual resource instances, evaluate the program expression at a first time to obtain a first list describing the plurality of data objects in the reference set at the first time, the list comprising a first plurality of entries each associated with a corresponding data object of the plurality of data objects, and determine that the first list includes N entries; and receive a second request to update the logical container in the virtual computing environment. Responsive to the second request, the system may: evaluate the program expression at a second time to obtain a second list describing the plurality of data objects in the reference set at the second time, the list comprising a second plurality of entries each associated with a corresponding data object of the plurality of data objects; determine that the second list includes k entries; compare N to k; responsive to a determination that k is greater than N, cause the resource allocation system to create (k–N) second virtual resource instances in the virtual computing environment, each of the (k–N) second virtual resource instances being configured according to the first configuration, and update the resource set record to further define (k–N) additional items of the resource set as each comprising a corresponding second virtual resource instance of the (k-N) second virtual resource instances; and, responsive to a determination that k is less than N, obtain the resource set record, identify (N-k) of the N first virtual resource instances as selected instances using information in the resource set record identifying the N first virtual resource instances, cause the resource allocation system to delete the selected instances, and update the resource set record to remove each of the N items comprising one of the selected instances.

The item definition may further describe a second configuration for virtual resource instances that execute in the virtual computing environment, and the instructions, when executed by the one or more processors, may further cause the system to, responsive to receiving the request: cause the resource allocation system to create N second virtual resource instances in the virtual computing environment, each of the N second virtual resource instances being configured according to the second configuration; and, create the resource set record to define the N items of the resource set as each further comprising a corresponding second virtual resource instance of the N second virtual resource instances.

In another aspect, this disclosure provides a system including one or more processors and memory storing computer-executable instructions that, when executed by the one or more processors, cause the system to: receive a request to perform a management operation on a logical container; obtain a first template defining the logical container and including a resource set definition for instantiating, a plurality of times in a virtual computing environment, a first virtual computing resource of one or more virtual computing resources that are members of the logical container; determine, using the resource set definition, that the first virtual computing resource is to be instantiated in the virtual computing environment N times; effect a launch into the virtual computing environment of N first virtual resource instances each configured according to a first configuration defined by the resource set definition; obtain, for each of the N first virtual resource instances, a corresponding instance identifier; and, associate the corresponding instance identifiers of the N first virtual resource instances with the logical container to enable management of the N first virtual resource instances as members of the logical container.

The resource set definition may include a size parameter and a first resource definition describing the first virtual computing resource and comprising the first configuration, and to determine that the first virtual computing resource is to be instantiated in the virtual computing environment N times, the instructions, when executed by the one or more processors, may further cause the system to: determine that a value of the size parameter is a reference value associated with a reference set of data objects; and, evaluate the reference value to determine that the reference set contains N data objects. Each of the N data objects may include a key and a corresponding unique value of N unique values associated with the key, and the instructions, when executed by the one or more processors, may further cause the system to: determine that the first resource definition comprises a configurable attribute and a logical value associated with the configurable attribute; obtain the N unique values associated with the key; and, to effect the launch of a the N first virtual resource instances, cause each of the N first virtual resource instances to be configured using a corresponding unique value of the N unique values as the logical value of the configurable attribute.

The instructions, when executed by the one or more processors, may further cause the system to: determine that the first resource definition comprises a configurable attribute and a logical value associated with the configurable attribute; and, to effect the launch of a the N first virtual resource instances, cause each of the N first virtual resource instances to be configured with a corresponding literal value as the logical value of the configurable attribute, the corresponding literal value being determined using array addressing semantics. Executing the instructions may cause the system to: determine that the management operation is to create the logical container in the virtual computing environment; determine that the first template comprises program code readable by the one or more processors to define the logical container and to create and configure programmable computing infrastructure resources in the virtual computing environment, the programmable computing infrastructure resources including the first virtual computing resource; using the program code, communicate with a resource allocation system of the virtual computing environment to, create the logical container in the virtual computing environment, create, using the resource set definition, a resource set in the logical container in the virtual computing environment, and launch a plurality of computing resource instances associated with the logical container and representing the programmable computing infrastructure resources, the plurality of computing resource instances including the N first virtual resource instances; and associate the N first virtual resource instances with the resource set to enable management of the N first virtual resource instances as a unit.

Executing the instructions may cause the system to: determine that the management operation is to perform an update of the logical container deployed in the virtual computing environment; obtain a master template comprising program code readable by the one or more processors and previously used to cause the logical container to be created in the virtual computing environment; determine that the first template contains the master template combined with the resource set definition; and, subsequent to associating the N instance identifiers with the logical container, replace the master template with the first template. The instructions, when executed by the one or more processors, may cause the system to receive a second request to update the logical container in the virtual computing environment and, responsive to the second request: determine whether the second request indicates that the logical container is to be updated using a modified resource set definition; responsive to a determination that the second request indicates the modified resource set definition, adopt the modified resource set definition as the resource set definition; determine, using the resource set definition, that the first virtual computing resource is to be instantiated in the virtual computing environment k times, k>N; effect a launch into the virtual computing environment of (k-N) second virtual resource instances each configured according to the first configuration defined by the resource set definition; obtain, for each of the (k-N) second virtual resource instances, a corresponding instance identifier; and, associate the corresponding instance identifiers of the (k-N) second virtual resource instances with the logical container to enable management of the (k-N) second virtual resource instances as members of the logical container.

The instructions, when executed by the one or more processors, may cause the system to receive a second request to update the logical container in the virtual computing environment and, responsive to the second request: obtain a second template defining the logical container and comprising a second resource set definition replacing the resource set definition of the first template; determine, using the second resource set definition, that the first virtual computing resource is to be instantiated in the virtual computing environment R times, R<N; and, using (N−R) of the N instance identifiers associated with the logical container, effect a deletion from the virtual computing environment of (N−R) of the N first virtual resource instances, such that R first virtual resource instances associated with the logical container remain executing in the virtual computing environment. The resource set definition may include a configurable attribute and a logical value associated with the configurable attribute, the logical value referencing a key and a reference set of data objects, and the instructions, when executed by the one or more processors, may further cause the system to: effect the launch of the N first virtual resource instances by obtaining, from the reference set of data objects, N initial unique values associated with the key, and causing each of the N first virtual resource instances to be configured using a corresponding unique value of the N initial unique values as the logical value of the configurable attribute; and, receive a second request to update the logical container in the virtual computing environment. Responsive to the second request, the system may: obtain, from the reference set of data objects, N updated unique values associated with the key; determine that the corresponding unique value used to configure a first instance of the N first virtual resource instances does not match any of the N updated unique values; effect a deletion from the virtual computing environment of the first instance; determine that a first unique value of the N updated unique values has not been used to configure any of the N first virtual resource instances; effect a launch into the virtual computing environment of a second virtual resource instance configured according to the first configuration and using the first unique value; obtain, for the second virtual resource instance, a corresponding instance identifier; and, associate the corresponding instance identifier of the second virtual resource instance with the logical container to enable management of the second virtual resource instance as a member of the logical container.

The instructions, when executed by the one or more processors, may cause the system to receive a second request to update the logical container in the virtual computing environment and, responsive to the second request: obtain a second template defining the logical container and submitted to replace the first template; determine that the second template does not include the resource set identifier; and, using the N instance identifiers associated with the logical container, effect a deletion from the virtual computing environment of the N first virtual resource instances.

In yet another aspect, this disclosure provides a system including one or more server computing devices having processors and memory storing specific computer-readable program instructions that, when executed by the one or more processors, cause the system to: receive a request to perform a management operation on a logical container; obtain a first template defining the logical container and comprising a resource set definition describing an item to be instantiated in a virtual computing environment a plurality of times, each instantiation of the item representing a first virtual computing resource and a second virtual computing resource of a plurality of virtual computing resources that are members of the logical container; determine, using the resource set definition, that the item is to be instantiated in the virtual computing environment N times; for each of N instantiations of the item in the virtual computing environment, effect a launch into the virtual computing environment of one or both of a corresponding first virtual resource instance configured according to a first configuration defined by the resource set definition and associated with the first virtual computing resource, and a corresponding second virtual resource instance configured according to a second configuration defined by the resource set definition and associated with the second virtual computing resource, the first and second virtual resource instances of a corresponding instantiation of the item being associated with each other; obtain, for each corresponding first virtual resource instance and each corresponding second virtual resource instance of the N item instances, a corresponding instance identifier; and, associate the corresponding instance identifiers with the logical container to enable management of the corresponding first virtual resource instances and the corresponding second virtual resource instances as members of the logical container.

The resource set definition may include: a first resource definition describing the first virtual computing resource according to a first resource type, the first resource definition comprising the first configuration; and, a second resource definition describing the second virtual computing resource according to a second resource type different from the first resource type, the second resource definition comprising the second configuration. The resource set definition may include a plurality of configuration parameters that define the first configuration, and to effect the launch of each corresponding first virtual resource instance, the instructions, when executed by the one or more processors, may cause the system to: obtain a plurality of fixed values for the plurality of configuration parameters; and, cause each of the corresponding first virtual resource instances to be assigned the plurality of fixed values as attributes of the first virtual resource instance, such that the corresponding first virtual resource instances are functionally equivalent copies of each other. To effect the launch of the N item instances, the instructions, when executed by the one or more processors, may cause the system to effect the launch of N of the corresponding first virtual resource instances and N of the corresponding second virtual resource instances. The resource set definition may include at least one conditional statement, and to effect the launch of the N item instances, the instructions, when executed by the one or more processors, cause the system to determine, based on the at least one conditional statement, that a first instantiation of the N instantiations of the item does not include the corresponding second virtual resource instance, such that less than N instances of the second virtual computing resource are launched into the virtual computing environment from the resource set definition. The instructions, when executed by the one or more processors, may further cause the system to cause a user interface to be displayed on a client computing device in communication with the one or more server computing devices, the user interface enabling the user to: define the first virtual resource, the second virtual resource, the first configuration, and the second configuration; define an item as including instances of the first virtual resource and the second virtual resource; define a resource set to be included in the members of the logical container, the resource set comprising multiple instances of an item; and, define a size indicating how many instances of the item to be included in the resource set. The system may further: receive user input from the client computing device, the user input entered into the client computing device via the user interface; from the user input, create the resource set definition; and, store the resource set definition in the first template.

The specification and drawings are to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising one or more processors and memory storing computer-executable instructions that, when executed by the one or more processors, cause the system to:
   receive a request to perform a management operation on a logical container, the system managing, as a unit, virtual computing resources identified as members of the logical container;
   obtain a first template comprising program code readable by the one or more processors to define the logical container and a resource set contained by the logical container in a virtual computing environment associated with a user of a computing resource service provider, the first template including a resource set definition describing the resource set and comprising:
      a first parameter associated with a size of the resource set, the size quantifying the virtual computing resources that the resource set is configured to contain, the first parameter including a program expression for accessing a plurality of data objects of a reference set associated with a data source; and
      an item definition describing a first configuration for an instance of the virtual computing resources that executes in the virtual computing environment;
   communicate with a resource allocation system of the virtual computing environment to create, in cooperation with the resource allocation system and using the resource set definition, the resource set in the logical container in the virtual computing environment;
   determine, using the first parameter, that the resource set is configured to contain N items each comprising one or more virtual resource instances, by:
      evaluating the program expression at a first time to obtain a first list describing the plurality of data objects in the reference set at the first time, the list comprising a first plurality of entries each associated with a corresponding data object of the plurality of data objects, and
      determining that the first list includes N entries;
   cause the resource allocation system to create N first virtual resource instances in the virtual computing environment, each of the N first virtual resource instances configured according to the first configuration;
   create an instantiated resource set record associated with the resource set and defining the N items of the resource set as each comprising a corresponding first virtual resource instance of the N first virtual resource instances;
   store the instantiated resource set record in an electronic data store in communication with the one or more processors and accessible by the user via a user device;
   receive a second request to update the logical container in the virtual computing environment; and
   responsive to the second request:
      evaluate the program expression at a second time to obtain a second list describing the plurality of data objects in the reference set at the second time, the list comprising a second plurality of entries each associated with a corresponding data object of the plurality of data objects,
      determine that the second list includes k entries, and
      effect a modification of the virtual computing environment such that k virtual resource instances associated with the logical container are in the virtual computing environment.

2. The system of claim 1, wherein the first parameter identifies a reference set of keys, and the instructions, when executed by the one or more processors, further cause the system to:
   generate N logical identifiers each associated with a corresponding key of the N keys;
   receive, from the resource allocation system, N physical identifiers each used by the resource allocation system to identify a corresponding first virtual resource instance of the N virtual resource instances; and
   store, in the instantiated resource set record, information associating each logical identifier of the N logical identifiers with a corresponding physical identifier of the N physical identifiers.

3. The system of claim 2, wherein the resource set and the N first virtual resource instances execute in a first context of the virtual computing environment, the first parameter comprises a program expression for accessing data in a second context distinct from the first context, the item definition includes a name that is unique to the N items of the resource set that are created from the item definition, and the instructions, when executed by the one or more processors, further cause the system to:
   resolve the program expression to obtain a list of the N keys and N values describing the data in the second context, each value of the N values associated with a corresponding key of the N keys; and
   to generate a first logical identifier of the N logical identifiers, combine the name with a first value of the N values to produce, as the first logical identifier, a string of characters.

4. The system of claim 1, wherein the instructions, when executed by the one or more processors, cause the system to:
   to effect the modification of virtual computing environment:
      compare N to k;
      responsive to a determination that k is greater than N:
         cause the resource allocation system to create (k−N) second virtual resource instances in the virtual computing environment, each of the (k−N) second virtual resource instances being configured according to the first configuration; and
         update the instantiated resource set record to further define (k−N) additional items of the resource set as each comprising a corresponding second virtual resource instance of the (k−N) second virtual resource instances; and
      responsive to a determination that k is less than N:
         obtain the instantiated resource set record;
         using information in the instantiated resource set record identifying the N first virtual resource instances, identify (N−k) of the N first virtual resource instances as selected instances;
         cause the resource allocation system to delete the selected instances; and
         update the instantiated resource set record to remove each of the N items comprising one of the selected instances.

5. The system of claim 1, wherein the item definition further describes a second configuration for virtual resource instances that execute in the virtual computing environment, and the instructions, when executed by the one or more processors, further cause the system to, responsive to receiving the request:
  cause the resource allocation system to create N second virtual resource instances in the virtual computing environment, each of the N second virtual resource instances being configured according to the second configuration; and
  create the instantiated resource set record to define the N items of the resource set as each further comprising a corresponding second virtual resource instance of the N second virtual resource instances.

6. A system, comprising one or more processors and memory storing computer-executable instructions that, when executed by the one or more processors, cause the system to:
  receive a request to perform a management operation on a logical container;
  obtain a first template defining the logical container and comprising a resource set definition for instantiating, a plurality of times in a virtual computing environment, a first virtual computing resource of one or more virtual computing resources that are members of the logical container;
  determine, using the resource set definition, that the first virtual computing resource is to be instantiated in the virtual computing environment N times;
  effect a launch into the virtual computing environment of N first virtual resource instances each configured according to a first configuration defined by the resource set definition;
  obtain, for each of the N first virtual resource instances, a corresponding instance identifier;
  associate the corresponding instance identifiers of the N first virtual resource instances with the logical container to enable management of the N first virtual resource instances as members of the logical container;
  receive a second request to update the logical container in the virtual computing environment;
  determine whether the second request indicates that the logical container is to be updated using a second resource set definition;
  responsive to a determination that the second request indicates that the logical container is to be updated using a second resource set definition, determine, using the second resource set definition, that the first virtual computing resource is to be instantiated in the virtual computing environment k times; and
  effect a modification of the virtual computing environment such that k virtual resource instances associated with the logical container are in the virtual computing environment.

7. The system of claim 6, wherein the resource set definition comprises a size parameter and a first resource definition describing the first virtual computing resource and comprising the first configuration, and to determine that the first virtual computing resource is to be instantiated in the virtual computing environment N times, the instructions, when executed by the one or more processors, further cause the system to:
  determine that a value of the size parameter is a reference value associated with a reference set of data objects; and
  evaluate the reference value to determine that the reference set contains N data objects.

8. The system of claim 7, wherein each of the N data objects includes a key and a corresponding unique value of N unique values associated with the key, and the instructions, when executed by the one or more processors, further cause the system to:
  determine that the first resource definition comprises a configurable attribute and a logical value associated with the configurable attribute;
  obtain the N unique values associated with the key; and
  to effect the launch of the N first virtual resource instances, cause each of the N first virtual resource instances to be configured using a corresponding unique value of the N unique values as the logical value of the configurable attribute.

9. The system of claim 6, wherein the instructions, when executed by the one or more processors, further cause the system to:
  determine that the first resource definition comprises a configurable attribute and a logical value associated with the configurable attribute; and
  to effect the launch of the N first virtual resource instances, cause each of the N first virtual resource instances to be configured with a corresponding literal value as the logical value of the configurable attribute, the corresponding literal value being determined using array addressing semantics.

10. The system of claim 6, wherein executing the instructions causes the system to:
  determine that the management operation is to create the logical container in the virtual computing environment;
  determine that the first template comprises program code readable by the one or more processors to define the logical container and to create and configure programmable computing infrastructure resources in the virtual computing environment, the programmable computing infrastructure resources including the first virtual computing resource;
  using the program code, communicate with a resource allocation system of the virtual computing environment to:
    create the logical container in the virtual computing environment;
    create, using the resource set definition, a resource set in the logical container in the virtual computing environment; and
    launch a plurality of computing resource instances associated with the logical container and representing the programmable computing infrastructure resources, the plurality of computing resource instances including the N first virtual resource instances; and
  associate the N first virtual resource instances with the resource set to enable management of the N first virtual resource instances as a unit.

11. The system of claim 6, wherein executing the instructions causes the system to:
  determine that the management operation is to perform an update of the logical container deployed in the virtual computing environment;
  obtain a master template comprising program code readable by the one or more processors and previously used to cause the logical container to be created in the virtual computing environment;
  determine that the first template contains the master template combined with the resource set definition; and
  subsequent to associating the N instance identifiers with the logical container, replace the master template with the first template.

12. The system of claim 6, wherein the instructions, when executed by the one or more processors, cause the system to:
to effect the modification of virtual computing environment responsive to the second request:
determine that k>N;
effect a launch into the virtual computing environment of (k−N) second virtual resource instances each configured according to the first configuration defined by the second resource set definition;
obtain, for each of the (k−N) second virtual resource instances, a corresponding instance identifier; and
associate the corresponding instance identifiers of the (k−N) second virtual resource instances with the logical container to enable management of the (k−N) second virtual resource instances as members of the logical container.

13. The system of claim 6, wherein the instructions, when executed by the one or more processors, cause the system to:
to effect the modification of virtual computing environment responsive to the second request:
determine that k<N; and
using (N−k) of the N instance identifiers associated with the logical container, effect a deletion from the virtual computing environment of (N−k) of the N first virtual resource instances, such that k first virtual resource instances associated with the logical container remain executing in the virtual computing environment.

14. The system of claim 6, wherein the resource set definition comprises a configurable attribute and a logical value associated with the configurable attribute, the logical value referencing a key and a reference set of data objects, and wherein the instructions, when executed by the one or more processors, further cause the system to:
to effect the launch of the N first virtual resource instances:
obtain, from the reference set of data objects, N initial unique values associated with the key; and
cause each of the N first virtual resource instances to be configured using a corresponding unique value of the N initial unique values as the logical value of the configurable attribute; and
responsive to the second request:
obtain, from the reference set of data objects, N updated unique values associated with the key;
determine that the corresponding unique value used to configure a first instance of the N first virtual resource instances does not match any of the N updated unique values;
effect a deletion from the virtual computing environment of the first instance;
determine that a first unique value of the N updated unique values has not been used to configure any of the N first virtual resource instances;
effect a launch into the virtual computing environment of a second virtual resource instance configured according to the first configuration and using the first unique value;
obtain, for the second virtual resource instance, a corresponding instance identifier; and
associate the corresponding instance identifier of the second virtual resource instance with the logical container to enable management of the second virtual resource instance as a member of the logical container.

15. The system of claim 6, wherein the instructions, when executed by the one or more processors, cause the system to:
responsive to the second request:
obtain a second template defining the logical container and submitted to replace the first template;
determine that the second template does not include the resource set identifier; and
using the N instance identifiers associated with the logical container, effect a deletion from the virtual computing environment of the N first virtual resource instances.

16. A system, comprising one or more server computing devices having processors and memory storing specific computer-readable program instructions that, when executed by the one or more processors, cause the system to:
receive a request to perform a management operation on a logical container;
obtain a first template defining the logical container and comprising a resource set definition describing an item to be instantiated in a virtual computing environment a plurality of times, each instantiation of the item representing a first virtual computing resource and a second virtual computing resource of a plurality of virtual computing resources that are members of the logical container;
determine, using the resource set definition, that the item is to be instantiated in the virtual computing environment N times;
for each of N instantiations of the item in the virtual computing environment, effect a launch into the virtual computing environment of one or both of:
a corresponding first virtual resource instance configured according to a first configuration defined by the resource set definition and associated with the first virtual computing resource; and
a corresponding second virtual resource instance configured according to a second configuration defined by the resource set definition and associated with the second virtual computing resource, the first and second virtual resource instances of a corresponding instantiation of the item being associated with each other;
obtain, for each corresponding first virtual resource instance and each corresponding second virtual resource instance of the N item instances, a corresponding instance identifier; and
associate the corresponding instance identifiers with the logical container to enable management of the corresponding first virtual resource instances and the corresponding second virtual resource instances as members of the logical container
receive a second request to update the logical container in the virtual computing environment;
determine whether the second request indicates that the logical container is to be updated using a second resource set definition;
responsive to a determination that the second request indicates that the logical container is to be updated using a second resource set definition, determine, using the second resource set definition, that the item is to be instantiated in the virtual computing environment k times; and
effect a modification of the virtual computing environment such that k items are instantiated in the virtual computing environment.

17. The system of claim 16, wherein the resource set definition comprises:

a first resource definition describing the first virtual computing resource according to a first resource type, the first resource definition comprising the first configuration; and a second resource definition describing the second virtual computing resource according to a second resource type different from the first resource type, the second resource definition comprising the second configuration.

18. The system of claim 16, wherein the resource set definition comprises a plurality of configuration parameters that define the first configuration, and to effect the launch of each corresponding first virtual resource instance, the instructions, when executed by the one or more processors, cause the system to:

obtain a plurality of fixed values for the plurality of configuration parameters; and cause each of the corresponding first virtual resource instances to be assigned the plurality of fixed values as attributes of the first virtual resource instance, such that the corresponding first virtual resource instances are functionally equivalent copies of each other.

19. The system of claim 16, wherein to effect the launch of the N item instances, the instructions, when executed by the one or more processors, cause the system to effect the launch of N of the corresponding first virtual resource instances and N of the corresponding second virtual resource instances.

20. The system of claim 16, wherein the resource set definition comprises at least one conditional statement, and to effect the launch of the N item instances, the instructions, when executed by the one or more processors, cause the system to determine, based on the at least one conditional statement, that a first instantiation of the N instantiations of the item does not include the corresponding second virtual resource instance, such that less than N instances of the second virtual computing resource are launched into the virtual computing environment from the resource set definition.

21. The system of claim 16, wherein the instructions, when executed by the one or more processors, further cause the system to:

cause a user interface to be displayed on a client computing device in communication with the one or more server computing devices, the user interface enabling the user to:

define the first virtual resource, the second virtual resource, the first configuration, and the second configuration;

define an item as including instances of the first virtual resource and the second virtual resource;

define a resource set to be included in the members of the logical container, the resource set comprising multiple instances of an item; and define a size indicating how many instances of the item to be included in the resource set;

receive user input from the client computing device, the user input entered into the client computing device via the user interface;

from the user input, create the resource set definition; and store the resource set definition in the first template.

* * * * *